United States Patent [19]

Woodley et al.

[11] Patent Number: 4,682,742

[45] Date of Patent: Jul. 28, 1987

[54] APPARATUS AND METHOD FOR LOADING TAPE INTO A CASSETTE

[75] Inventors: George M. Woodley, Shrewsbury, Mass.; William S. Bakes, Somersworth, N.H.

[73] Assignee: King Instrument Corporation, Westboro, Mass.

[21] Appl. No.: 816,629

[22] Filed: Jan. 6, 1986

[51] Int. Cl.[4] .................. B31F 5/06; B65H 21/00
[52] U.S. Cl. .................... 242/56 R; 156/506
[58] Field of Search ............ 242/56 R, 58.1, 58.4; 156/502, 505, 506, 507, 508, 157, 159

[56] References Cited

U.S. PATENT DOCUMENTS

| 3,637,153 | 1/1972 | King | 242/56 R |
|---|---|---|---|
| 3,737,358 | 6/1973 | King | 242/56 R X |
| 3,753,835 | 8/1973 | King | 156/506 |
| 3,825,461 | 7/1974 | Gorman | 242/56 R X |
| 3,997,123 | 12/1976 | King | 242/56 R |
| 4,061,286 | 12/1977 | King et al. | 242/56 R |
| 4,062,719 | 12/1977 | Masuzima et al. | 156/506 X |
| 4,136,838 | 1/1979 | Bosco | 242/56 R |
| 4,364,791 | 12/1982 | Kincheloe | 156/506 |
| 4,385,959 | 5/1983 | Goguen | 156/506 |
| 4,430,145 | 2/1984 | Berube | 242/56 R X |
| 4,462,858 | 7/1984 | Goguen et al. | 242/56 R X |
| 4,475,970 | 10/1984 | Farrow et al. | 156/159 |
| 4,478,674 | 10/1984 | Clark | 156/506 X |
| 4,486,262 | 12/1984 | Woodley | 242/56 R X |
| 4,497,454 | 2/1985 | Woodley | 242/56 R |
| 4,586,672 | 5/1986 | King et al. | 242/56 R |
| 4,632,327 | 12/1986 | Kreeft et al. | 242/56 R |

*Primary Examiner*—John M. Jillions
*Attorney, Agent, or Firm*—Schiller, Pandiscio & Kusmer

[57] ABSTRACT

A novel shift block assembly is provided for a cassette tape loading machine. The shift block assembly essentially comprises first, second and third shift blocks that are mounted for sliding and rotating motion on a common axis. Each of the shift blocks has a guideway for aligning tape to be spliced and also is provided with means for applying suction to hold a tape in position in the guideway. The three blocks are disposed in tandem along the common axis, and the first and third shift blocks are used to hold the two leaders, while the second shift block is used to hold the tape to be loaded. Means are provided for shifting each block axially along the axis and additional means are provided for rotating each block relative to the other on the axis. Also associated with the shift block assembly is a cutter mechanism which includes a knife having a knife edge disposed in a given cutting plane extending at a right angle to the aforementioned axis. The cutter mechanism is adapted for reciprocal operation so as to cause its knife blade to move back and forth along a first line of separation between the first and second shift blocks or a second line of separation between the second and third shift blocks, whereby the knife edge will sever a tape that extends between a pair of blocks across a given line of separation.

30 Claims, 31 Drawing Figures

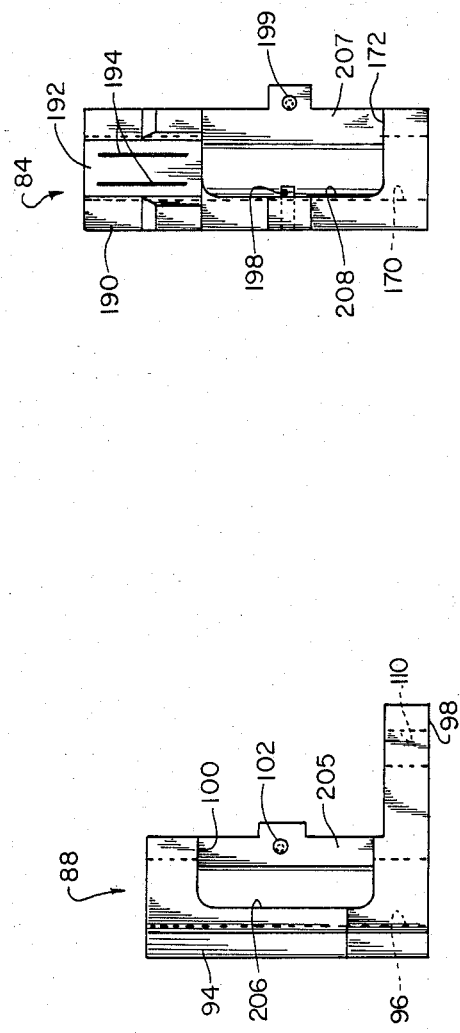

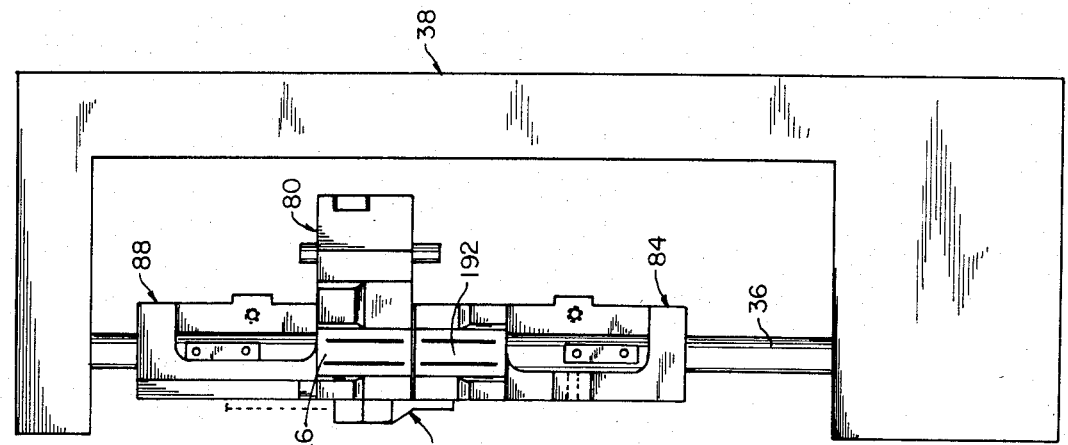
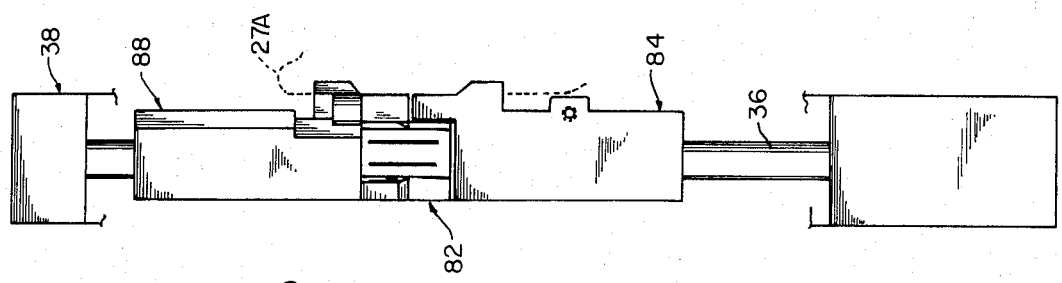
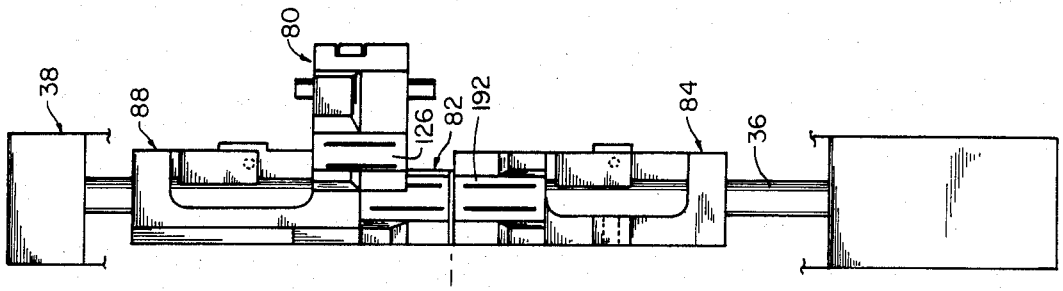
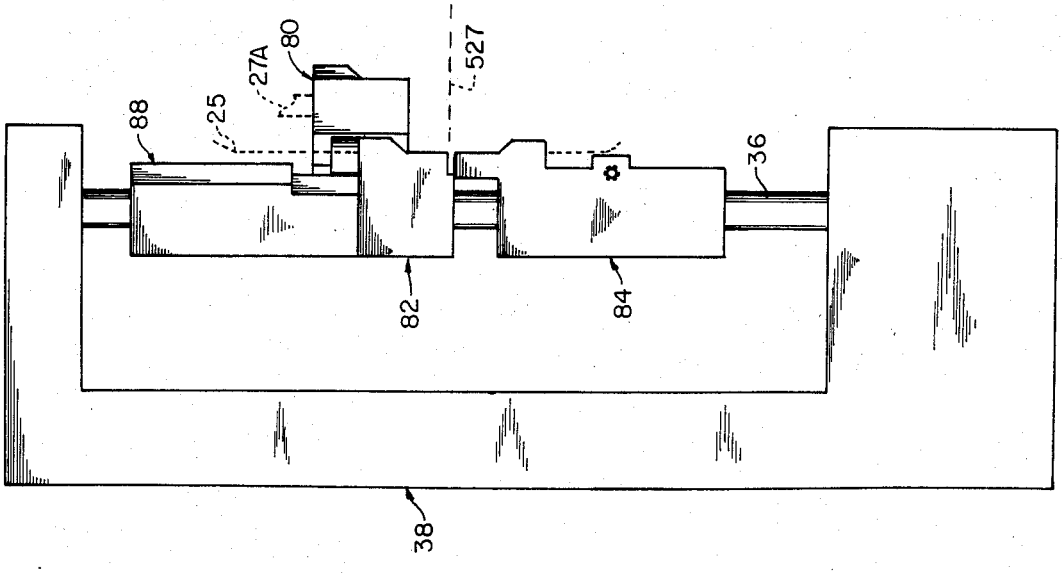
FIG. 18F
FIG. 17F
FIG. 18E
FIG. 17E

APPARATUS AND METHOD FOR LOADING TAPE INTO A CASSETTE

This invention relates to tape loading machines and more particularly to machines for splicing and winding tape into cassettes.

BACKGROUND OF THE INVENTION

A variety of machines are known for loading magnetic tape onto hubs or into cassettes. U.S. Pat. Nos. 3,637,153, 3,737,358, 3,997,123, 4,061,286 and 4,062,719 illustrate machines for loading magnetic tape into various types of cassettes, including the Philips-type cassettes used for audio recordings. U.S. Pat. Nos. 4,512,904 and 4,486,262 illustrate machines for loading magnetic tape into conventional video-type cassettes, e.g., VHS or Beta type cassettes. The audio cassettes and the video tape cassettes are similar in that the loaded cassettes consist of a cassette case containing two rotatable spools or hubs, a leader attached to each spool or hub, and a predetermined length of magnetic tape having its ends spliced to the two leaders. However, VHS and Beta type video cassettes are substantially larger than Philips-type cassettes and differ therefrom in that they have (1) a pivoted door which conceals the tape when the cassette is not in use, (2) means for releasably locking the door, and (3) means for releasably locking the hubs against rotation.

The manufacture of loaded audio and video cassettes is similar in that the common practice is to start with a C-Zero ("C-0") cassette, i.e., a cassette that consists of the cassette case with the two hubs and a length of leader tape having one end connected to one hub and the other end connected to the second hub. These C-Zero cassettes are then filled with blank or prerecorded tape by means of automatic loading machines of the type disclosed in the above-identified patents. The loading procedure typically comprises the following steps: (1) cutting the leader tape so as to form two discrete leaders; (2) splicing the leading end of the magnetic tape to be wound into the cassette to one of the two leaders; (3) rotating the hub to which that one leader is connected so as to wind a given length of magnetic tape onto that hub; (4) cutting the magnetic tape after the given amount has been wound into the cassette; (5) splicing the trailing end of the given length of magnetic tape to the second leader attached to the other hub; (6) winding the trailing end of the given length of magnetic tape and the second leader into the cassette; and (7) ejecting the loaded cassette and replacing it with a new C-Zero cassette. The procedure for loading magnetic tape into C-zero video cassettes is the same as for audio tape, except that the loading machine must be capable of opening the door to the video cassette in order to permit extraction of the leader tape from the cassette, unlocking the hubs, and holding the door open during the time that the loading operation is being conducted.

Because the leader tape in a C-Zero video cassette is relatively short in comparison to the leader tape customarily provided in audio cassettes, the machines for loading video cassettes are more complicated by virtue of the necessity of working with a shorter leader.

Recently a new form of video cassette called the 8 millimeter ("8 mm.") video cassette has been developed. The 8 mm. cassette case is much smaller than those of the VHS and Beta type cassettes and in fact its length and breadth are closer to the corresponding dimensions of a Philips-type audio cassette case. However, the thickness of an 8 mm. video cassette is substantially greater than that of a Philips-type cassette because of the fact that its video tape is substantially wider than conventional audio tape. A further significant difference is that the leader in a C-Zero 8 mm. cassette is much shorter than the leader in the larger size VHS or Beta video cassettes. The leader of an 8 mm. cassette is only about 140 mm. long from hub to hub. Therefore when the leader is paid off from the two hubs, only a short portion of its length is available outside the cassette case for cutting, splicing and winding. This short length of available leader tape makes it impossible or unsatisfactory to use cassette loading machines of the kind previously known to load magnetic tape into 8 mm. cassettes. In this connection it is to be appreciated that it is necessary to satisfy the requirements of video cassette manufacturers regarding the quality, reliability and speed of cassette loading operations.

BRIEF SUMMARY OF THE INVENTION

The primary object of this invention is to provide a new and improved shift block assembly (also sometimes referred to as a "splicer block assembly") for use in loading C-zero cassettes having a relatively short leader.

A more specific object of this invention is to provide a new and improved shift block assembly for use in loading magnetic tape into 8 millimeter video cassettes.

A further object of the invention is to provide a new shift block assembly which differs from prior shift block assemblies in that it comprises three separate tape-supporting members, i.e., shift blocks, one each for holding one of the two leaders and the third for holding the tape which is to be wound into the cassette, disposed along a common axis.

A further object of the invention is to provide a new and improved shift block assembly for automatic cassette loading machines which is characterized by a new mode of operation.

Still another object of the invention is to provide a novel shift block assembly which involves multiple modes of movement of component tape supporting members.

A further object is to provide a cassette loading machine that is characterized by a novel and improved shift block assembly, and in particular a machine for loading C-Zero cassettes having relatively short leader tapes.

Still another object is to provide a new method of loading a use tape into C-Zero cassettes.

These and other objects of the invention are achieved by providing a shift block assembly that essentially comprises first, second and third shift blocks that are mounted for sliding and rotating motion on a common axis. Each of the shift blocks has a guideway for aligning tape to be spliced and also is provided with means for applying suction to hold a tape in position in the guideway. The three blocks are disposed in tandem along the common axis, and the first and third shift blocks are used to hold the two leaders, while the second shift block is used to hold the tape to be loaded. Means are provided for shifting each block axially along the axis and additional means are provided for rotating each block relative to the other on the axis. Also associated with the shift block assembly is a cutter mechanism which includes a knife having a knife edge disposed in a given cutting plane extending at a right angle to the aforementioned axis. The cutter mechanism is adapted for reciprocal operation so as to cause its knife blade to move back and forth along a first line of separation between the first and second shift blocks or a second line of separation between the second and third shift blocks, whereby the knife edge will sever a tape that extends between a pair of blocks across a given line of separation. The shift blocks are manipulated so as to allow the leader of a C-Zero cassette to be severed by the knife mechanism and spliced to a predetermined length of a tape that is loaded into the cassette.

Other features and many of the attendant advantages of the invention are set forth in or rendered obvious by the following detailed specification which is to be considered together with the following accompanying drawings wherein:

FIGS. 6 and 7 are enlarged front elevational views of two members of the shift block assembly;

Figure 18B:
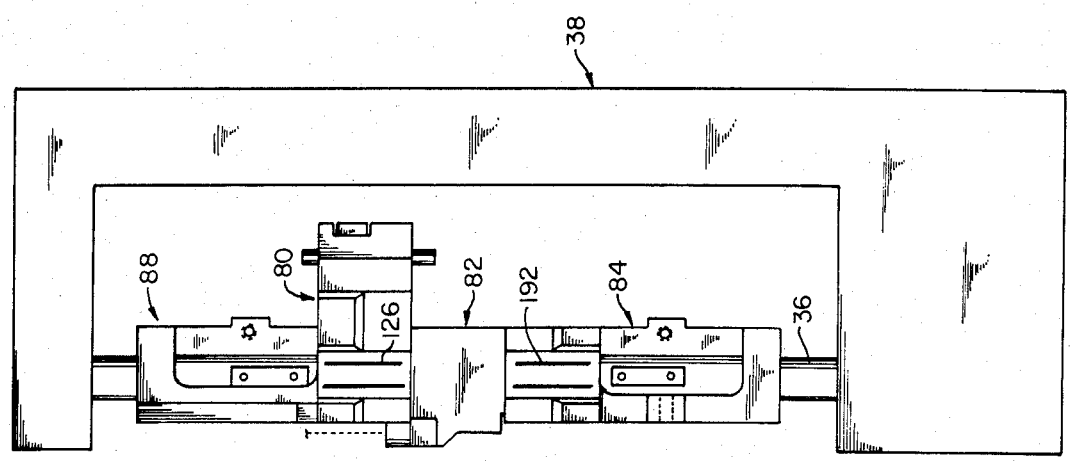
Figure 18A:
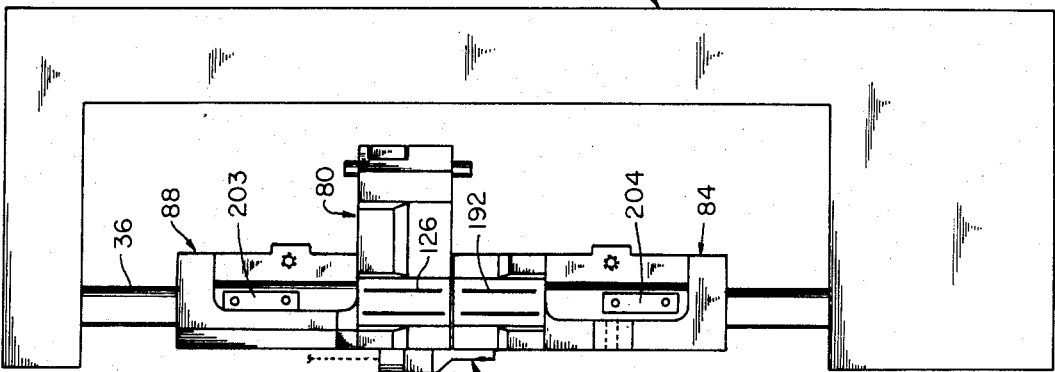
Figure 17A:
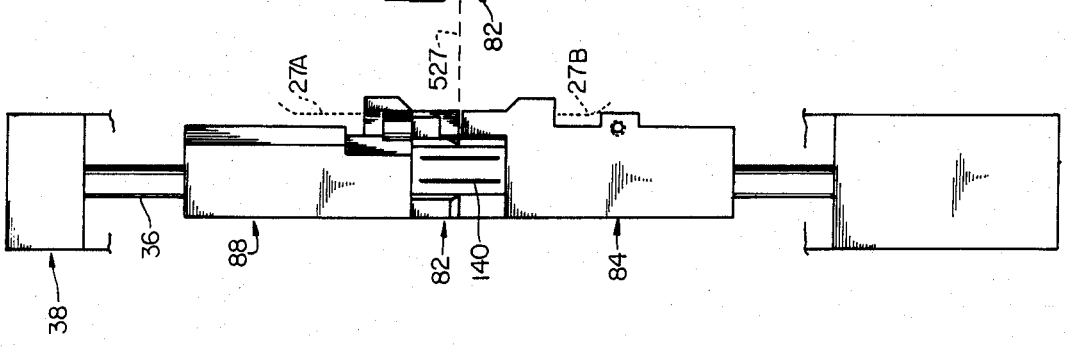
Figure 18D:
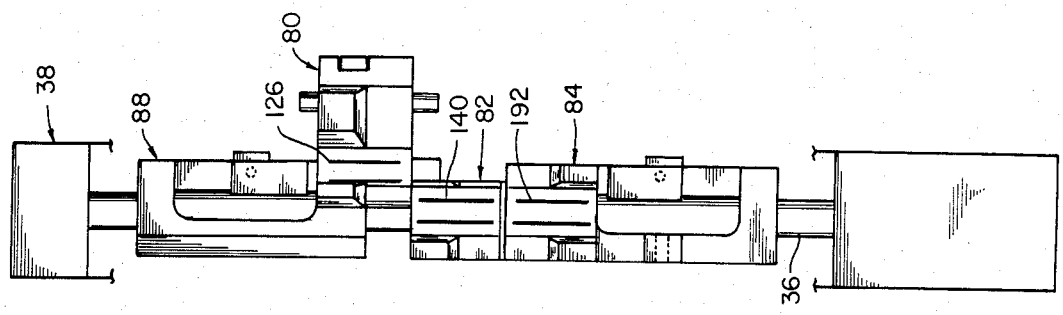
Figure 17D:
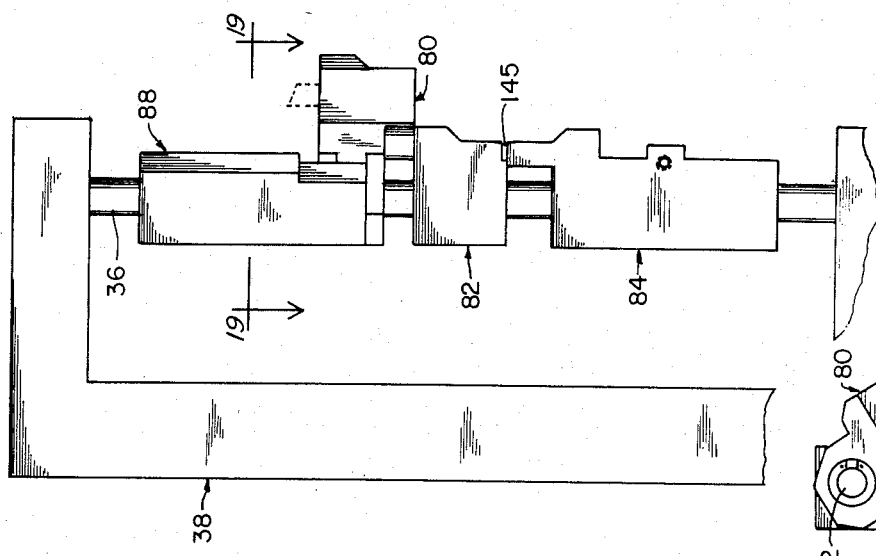
Figure 19:
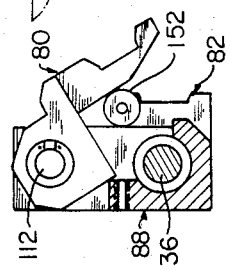

FIGS. 17A-G are fragmentary front elevational views of the shift block assembly sequentially illustrating its different operating positions during a cassette loading operation;

FIGS. 18A-G are fragmentary side elevational view of the shift block assembly corresponding to FIGS. 17A-G; and FIG. 19 is a cross-sectional view of the upper shift block assembly taken along line 19—19 of FIG. 17D.

While machines for loading other types of cassettes may be made using the present invention, the preferred embodiment of the invention, as disclosed in the following detailed description and the drawings, is a machine for loading 8 mm. cassettes.

DESCRIPTION OF 8 MM CASSETTE

Figure 1:
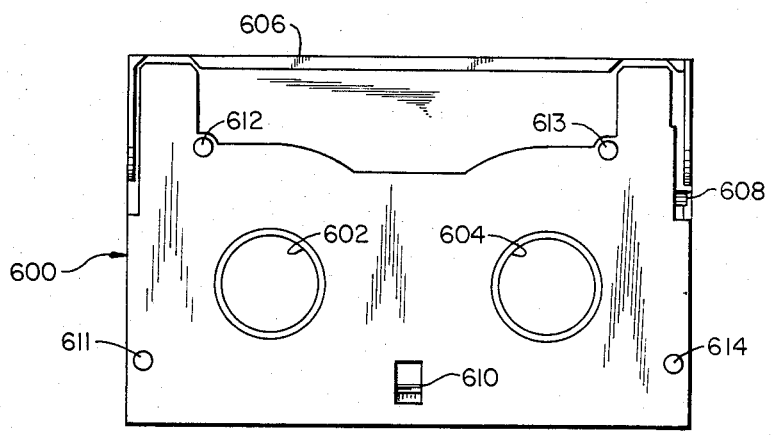
FIG. 1 is a rear view of an 8 mm. video cassette.

As seen in FIG. 1, an 8 mm. cassette comprises a cassette case 600 containing a pair of rotatable hubs 602 and 604, a pivotally mounted door 606, a door locking mechanism (not shown) that is released by depressing a door release arm 608, a hub locking mechanism (not shown) that is released by depressing a hub unlocking tab 610, and four blind cavities 611, 612, 613, and 614 for receiving fixed cassette locater pins that locate the cassette in its corresponding video recorder.

GENERAL DESCRIPTION OF MACHINE EMBODYING THE INVENTION

Figure 2:
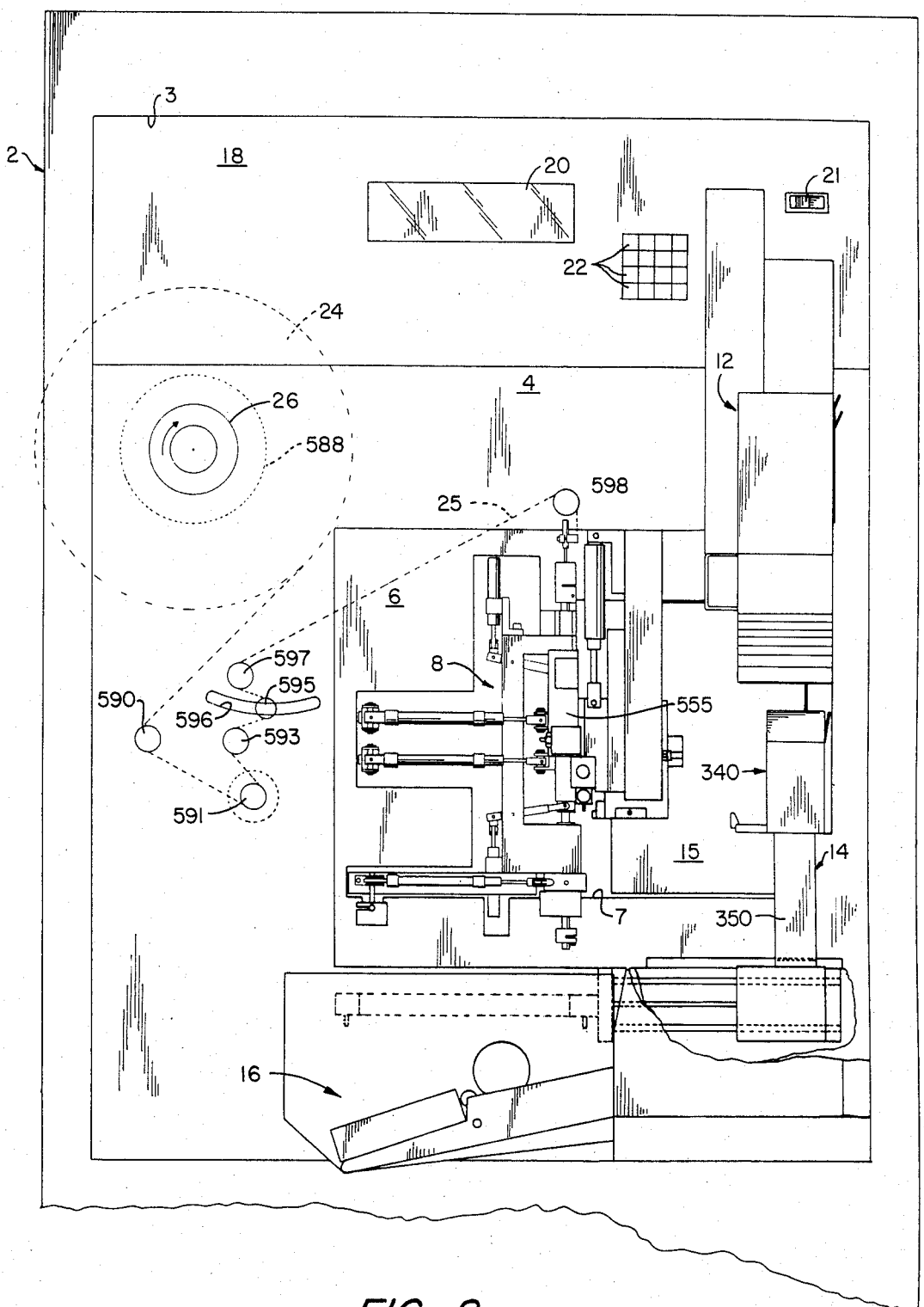
FIG. 2 is a front elevation of a cassette tape winding and splicing machine embodying a shift block assembly constructed in accordance with this invention.

Turning now to FIG. 2, there is illustrated an automatic cassette loading machine embodying the present invention. The illustrated machine comprises a cabinet or console 2 having a front wall with a cutout 3 in which is removably mounted a front panel 4. The latter in turn has a cutout 5 in which is releasably secured an insert panel 6 that carries a shift block assembly identified generally at 8 and a splicer assembly identified generally at 555. Also mounted on front panel 4 is a magazine assembly 12 for supporting a plurality of cassettes to be loaded, and a cassette collection assembly 16 which receives cassettes after they have been loaded. The machine also includes a cassette transport mechanism 14 which is adapted to receive cassettes discharged from magazine 12 and transport them to a loading station located proximate to shift block assembly 8, and a flat traverse carriage plate 15 that is movably mounted in front of a cutout 7 in insert plate 6 and carries cassette holding and positioning mechanisms hereinafter described. Also releasably mounted in cutout 3 above front panel 4 is an auxiliary panel 18 which supports portions of the control system (hereinafter described), including an electronic display unit 20, an on/off power switch 21, and a plurality of push-button type selection switches 22 that coact with the control system for selecting the amount of tape to be loaded into a cassette and performing selected test functions, e.g., testing operation of the splicer or shift block assembly. A reel 24 of use tape 25 to be loaded is supported on a supply reel shaft assembly 26.

As used herein, the term "use tape" signifies a tape that is to be loaded into a C-Zero cassette. The use tape may be a blank tape or a prerecorded tape.

It is believed obvious that to the extent herein described, the machine illustrated in FIG. 1 is similar to prior cassette loading machines that are adapted to maintain a C-Zero cassette in a predetermined loading station while conducting the necessary operations of extracting the leader tape from that cassette and placing it on a pair of shift blocks, severing the leader tape into two leaders, splicing a first one of the leaders to the leading end of the use tape, winding the use tape and first leader into the cassette to be loaded, terminating winding, cutting the use tape to form a trailing end and a new leading end, splicing the trailing end of the use tape to the second leader, pulling the trailing end of the use tape and the second leader into the cassette, and then discharging the loaded cassette from the machine so that a new cycle of operation may be conducted wherein a second C-Zero cassette is loaded with use tape in the manner previously described.

SHIFT BLOCK ASSEMBLY MECHANISM

Figure 3:
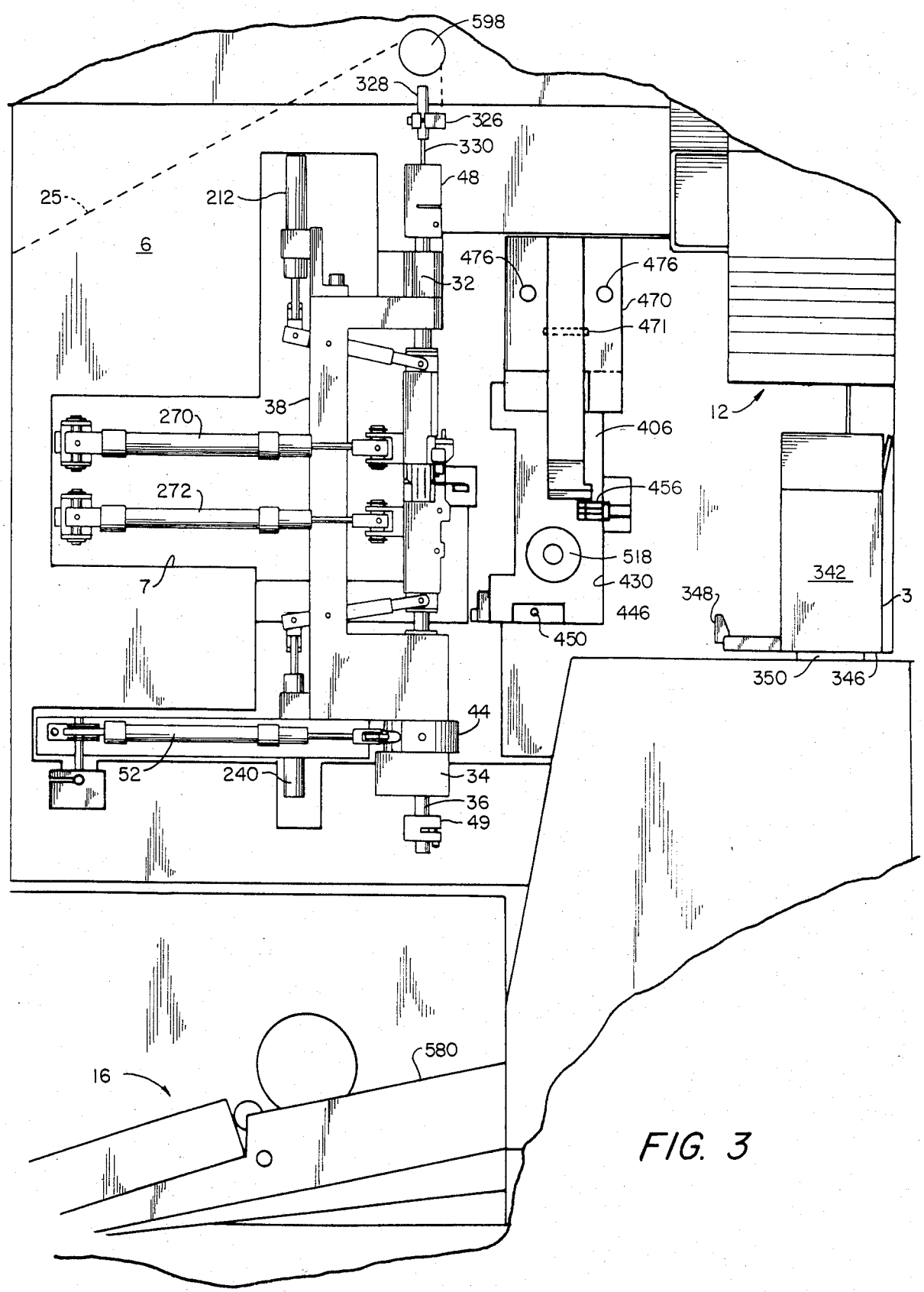
FIG. 3 is an enlargement of a portion of FIG. 2 but with the splicer removed.
Figure 4:
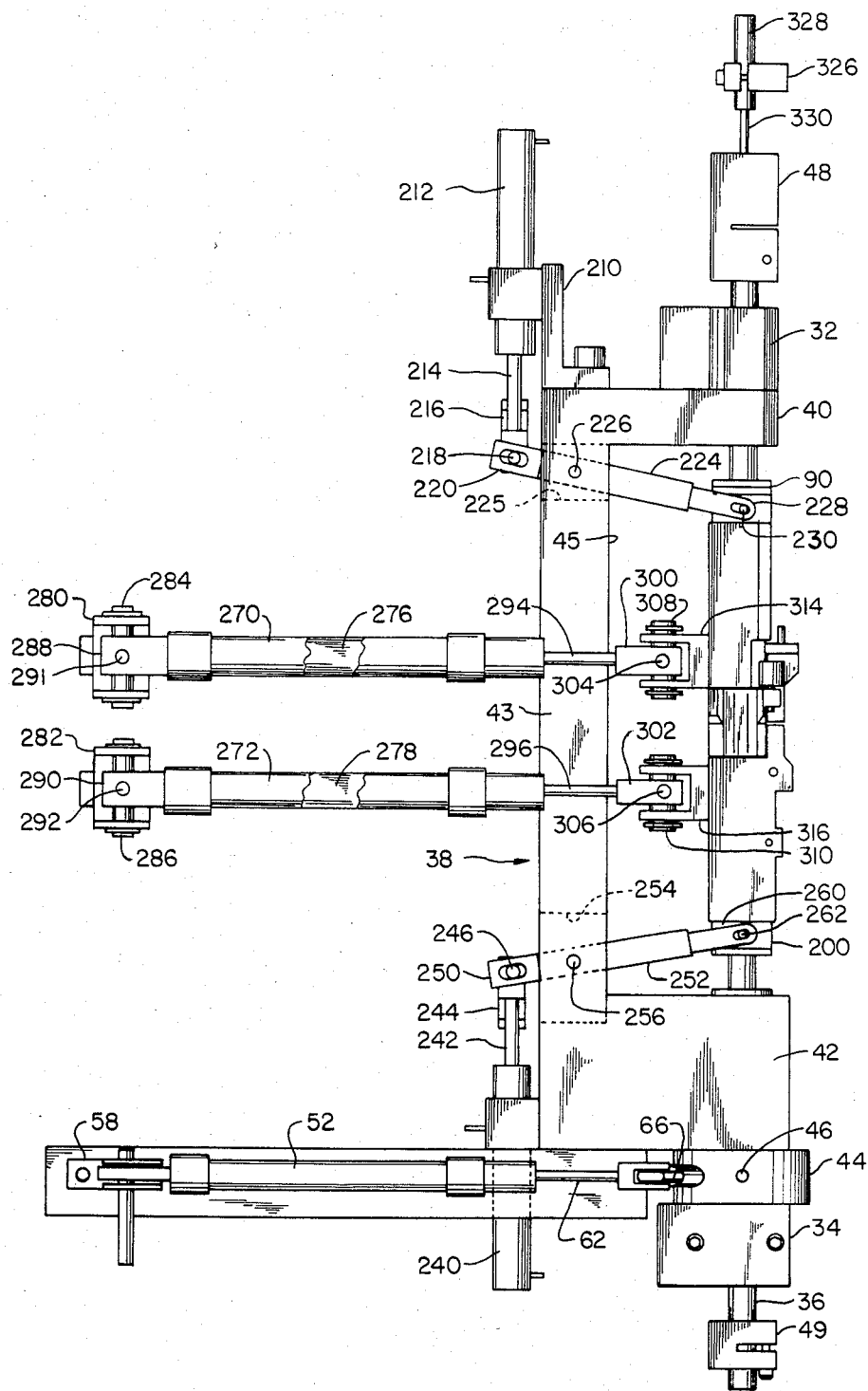
FIG. 4 is an enlarged view in front elevation of the shift block assembly.

Referring to FIGS. 2–7, shift block assembly 8 is pivotally attached to the insert panel 6 by means of a pair of bearing blocks 32 and 34 which are affixed to insert panel 6. Extending through the bearing blocks is a shaft 36 (see FIGS. 4 and 5 for details). Shaft 36 is capable of axial and rotational movement in the two bearing blocks. Rotatably mounted on shaft 36 is a yoke 38 comprising a pair of horizontal arms 40 and 42 and a vertical spine or connecting section 43 (FIG. 4). The yoke is kept in spaced relation to the bottom bearing block 34 by a crank block 44 which is coupled to shaft 36 by means of a pin 46. The latter extends diametrically through an elongate slot 45 (FIG. 5) in shaft 36. Slot 45 is sized so as to allow pin 46 to shift lengthwise in the slot while restraining it against rotational movement about the shaft axis. The ends of pin 46 are fixed in crank block 44. Crank block 44 extends between bearing block 34, and the lower arm 42 of yoke 38. The upper bearing 32 lightly engages the upper arm section 40 of the yoke, whereby the yoke is able to rotate on shaft 36 while being restrained from axial movement on shaft 36 by bearings 32 and 34. Also mounted on shaft 36 are two collars 48 and 49. These collars are affixed to the shaft so as to move therewith and are in spaced relation to bearing blocks 32 and 34, so as to allow limited axial movement of shaft 36 in bearing blocks 32 and 34. Collar 48 limits downward movement of shaft 36 by virtue of its engagement with bearing block 32, while the bottom collar 49 limits upward movement of shaft 36 by virtue of its engagement with bearing block 34.

Figure 9:
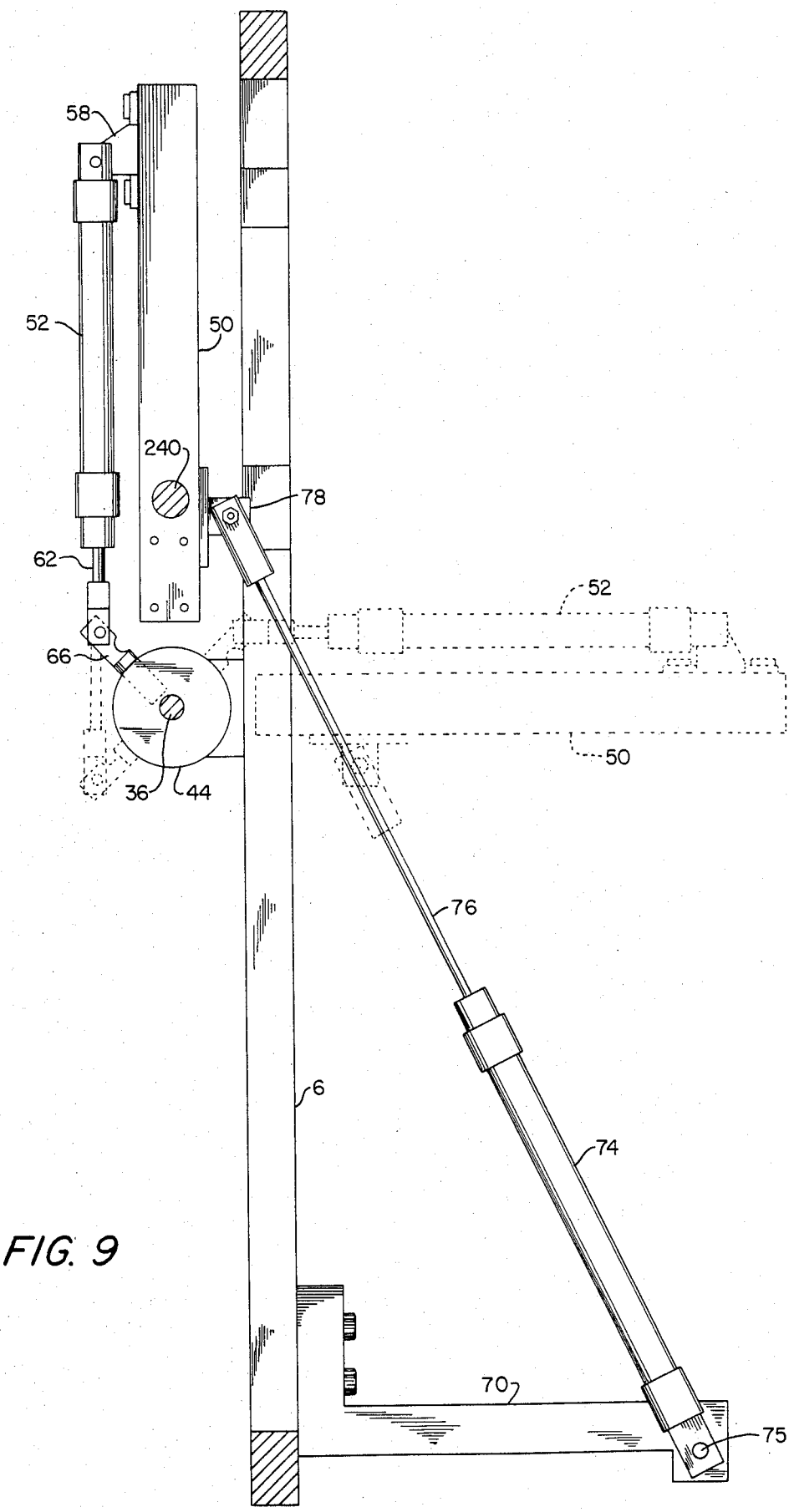
FIG. 9 is a plan sectional view taken along line 9—9 of FIG. 8.

Referring now to FIGS. 2–4 and 9, attached to the bottom end of yoke 38 is a lever bar 50. The latter extends parallel to and is aligned with the lower arm 42 of yoke 38. Attached to bar 50 is a pneumatic actuator 52. One end of the cylinder of actuator 52 is pivotally coupled to a bracket 58 that is affixed to bar 50. The piston rod 62 of actuator 52 is pivotally secured to a crank arm 66 that is attached to and projects radially from crank block 44. As seen in FIG. 9, bar 50 extends radially from shaft 36 and actuator 52 is mounted on the front side of bar 50. When actuator 52 is pressurized so as to extend its piston rod 62, the extending or forward movement of the piston rod causes crank block 44 to rotate counterclockwise as viewed in FIG. 9. Reverse movement of the crank block occurs when piston rod 66 is retracted.

Figure 8:
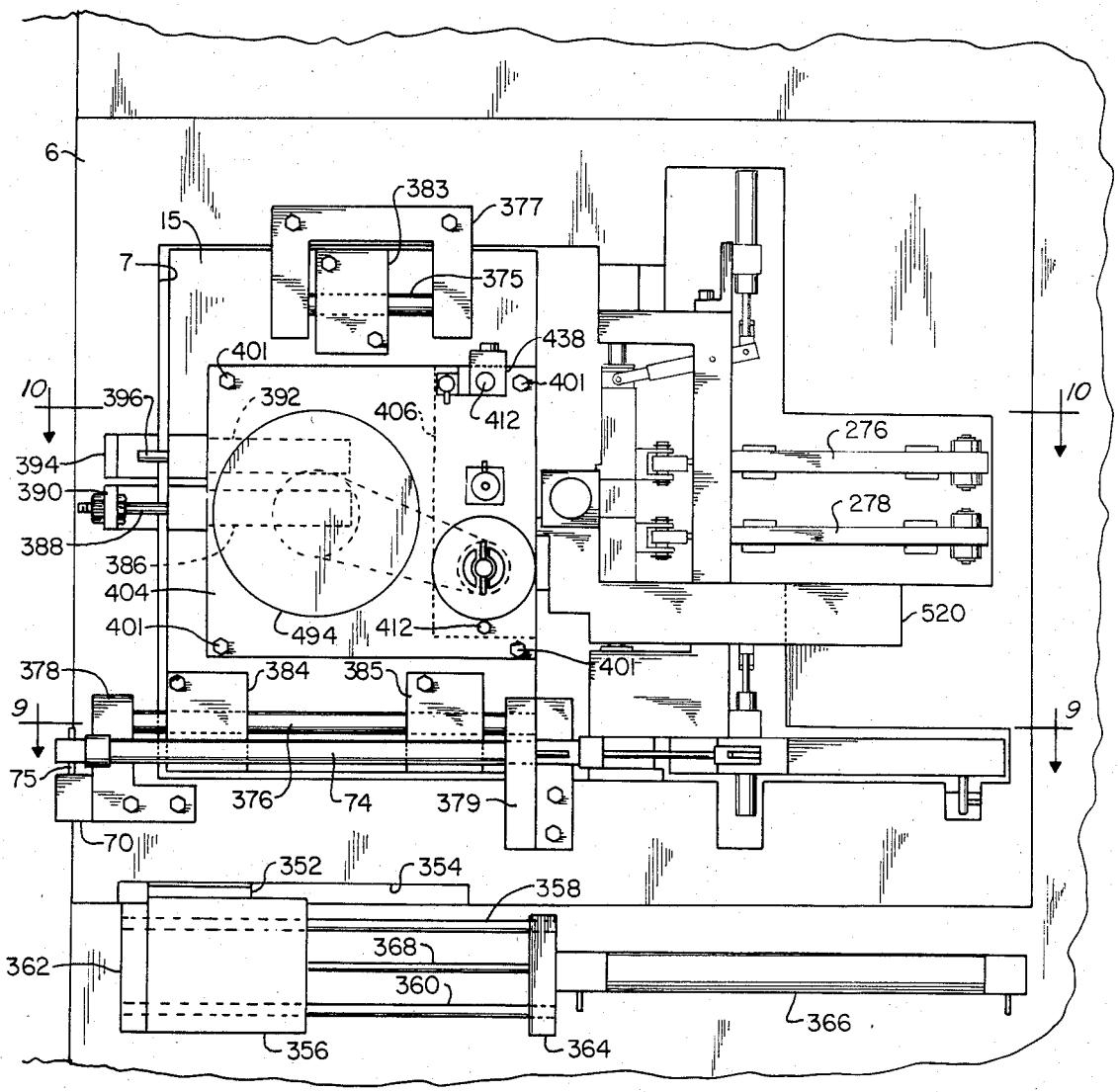
FIG. 8 is a fragmentary rear view in elevation of the same cassette loading machine.

Still referring to FIGS. 8 and 9, attached to the rear side of insert panel 6 by means of a bracket 70 is a pneumatic actuator 74. One end of the cylinder of actuator 74 is pivotally mounted to the bracket 70 by a pivot pin 75. The piston rod 76 of actuator 74 is pivotally attached to an arm 78 that is affixed to the rear side of lever bar 50. In FIG. 9 actuator 74 is shown with its piston rod 76 fully extended, in which position it locates lever bar 50 and yoke 38 in their first limit position wherein they are parallel to insert panel 6. When piston rod 76 is retracted, lever bar 50 and yoke 38 are caused to rotate clockwise around shaft 36 (as viewed in FIG. 9), thereby causing corresponding movement of yoke 38. Suitable stop means (not shown) limit rotation of lever bar 50 and yoke 38 to an angle of 90 degrees between first and second limit positions. FIG. 9 illustrates in dotted lines the second limit position of lever bar 50 when piston rod 76 is retracted.

Turning now to FIGS. 4–7, the shift block assembly 8 comprises an upper shift block 80, a middle shift block 82, and a bottom shift block 84. Shift block 80 forms part of an upper shift block subassembly, the latter including a shift block support member 88, a collar member 90 and a bushing 92.

With regard to the upper shift block subassembly, shift block support member 88 comprises an elongate body section 94 of rectangular cross-section having a through bore 96 and a right angle extension or arm 98 at one end. Body section 94 also has a rectangular recess 100 (FIG. 6) that intersects bore 96. Recess 100 is characterized by two flat surfaces 205 and 206 that are at a right angle to one another. An adjustable stop pin 102 is screwed into a threaded hole in flat surface 205 at a right angle to the axis of arm 98. The collar member 90 is secured to support member 88 by bushing 92, the latter being press-fitted into the collar member and the upper end of bore 96. A similar bushing (not shown) is press-fitted into the bottom end of bore 96. These two bushings have identical inner diameters sized so as to make a sliding and rotating fit on shaft 36. Arm 98 of support member 88 is provided with flat upper and lower surfaces and a through bore 110 to accommodate a pivot pin 112 for shift block 80.

Upper shift block 80 comprises a body section 114 and a pair of parallel spaced arms 116 and 118 that extend over and under arm 98 and are provided with aligned holes fitted with bushings 120 sized to make a close rotating fit with pivot pin 112. A coil spring 122 surrounding pivot pin 112 and engaged at one end with a pin 123 on shift block 80 and at the other end with shift block support member 88, acts to bias the shift block 80 on pivot pin 112 so as to keep its body section 114 engaged with the flat front surface 128 of support member 88, in which position flat recessed surface 126 hereinafter described of shift block 80 lies parallel to flat surface 128. Body section 114 of shift block 80 is formed with a flat recessed surface 126 that functions as a support and guide for the use tape that is to be loaded into the C-Zero cassette. The flat recessed surface 126 of shift block 80 is provided with a plurality of elongated narrow slits 134 (approximately 0.001–0.005 inch wide) which are connected to an interior chamber (not shown) having a port fitted with a hose fitting 136 adapted for connection to a hose line (not shown) leading to a source of vacuum via electrically controlled valve means.

The middle shift block 82 is of generally rectangular cross-section and is provided with a recessed flat surface 140 having two or more slits 142, similar to slits 134, that communicate with an interior chamber (not shown) in shift block 82. The interior chamber is provided with a port that is fitted with a hose fitting 144 adapted for connection to a hose line (not shown) leading to a vacuum source via suitable electrically controlled valve means. The middle shift block 82 is provided with a flat recess 145 at its lower end and also lateral extension 148 having a hole for receiving a pin 150 that rotatably supports a small roller 152. The purpose of roller 152 is described hereinafter. Middle shift block 82 is provided with a through hole 156 that is sized so as to make a close fit with shaft 36. Shift block 82 is affixed to shaft 36, e.g., by a set screw or roll pin (not shown), so that it and shaft 36 form a unitary subassembly.

The lower or bottom shift block 84 (FIGS. 5 and 7) also has a rectangular cross-section and is formed with a through bore 170 and a rectangular recess 172 that intersects bore 170. Recess 172 is characterized by two flat surfaces 207 and 208 that are at a right angle to one another. The upper end of bore 170 is fitted with a bushing 182 sized so as to make a close but rotatable and sliding fit with shaft 36.

The upper end of lower shift block 84 has an extension 190 characterized by a recessed flat surface 192 that is interrupted by two or more elongated narrow slits 194 similar to slits 134 and 142. Slits 194 communicate with an interior chamber (not shown) formed in the main body of shift block 84 and extending into extension 190. That interior chamber is provided with a port in which is secured a hose fitting 196 that is used for coupling the interior chamber to a suitable source of vacuum via a hose line (not shown) and suitable electrically controlled valve means. Two adjustable stop pins 198 and 199 are screwed into lateral extensions on block 84 at a right angle to the plane of recessed flat surface 192.

Attached to the bottom end of shift block 84 is a collar member 200 similar to collar member 90. A bushing 204 similar to bushing 92 is press-fitted into collar 200 and the lower end of bore 170 so as to lock the collar member to shift block 84.

It is to be appreciated that support member 88 and collar 92 form a discrete unit and lower shift block 84 and collar member 200 likewise form a discrete unit.

Figure 5:
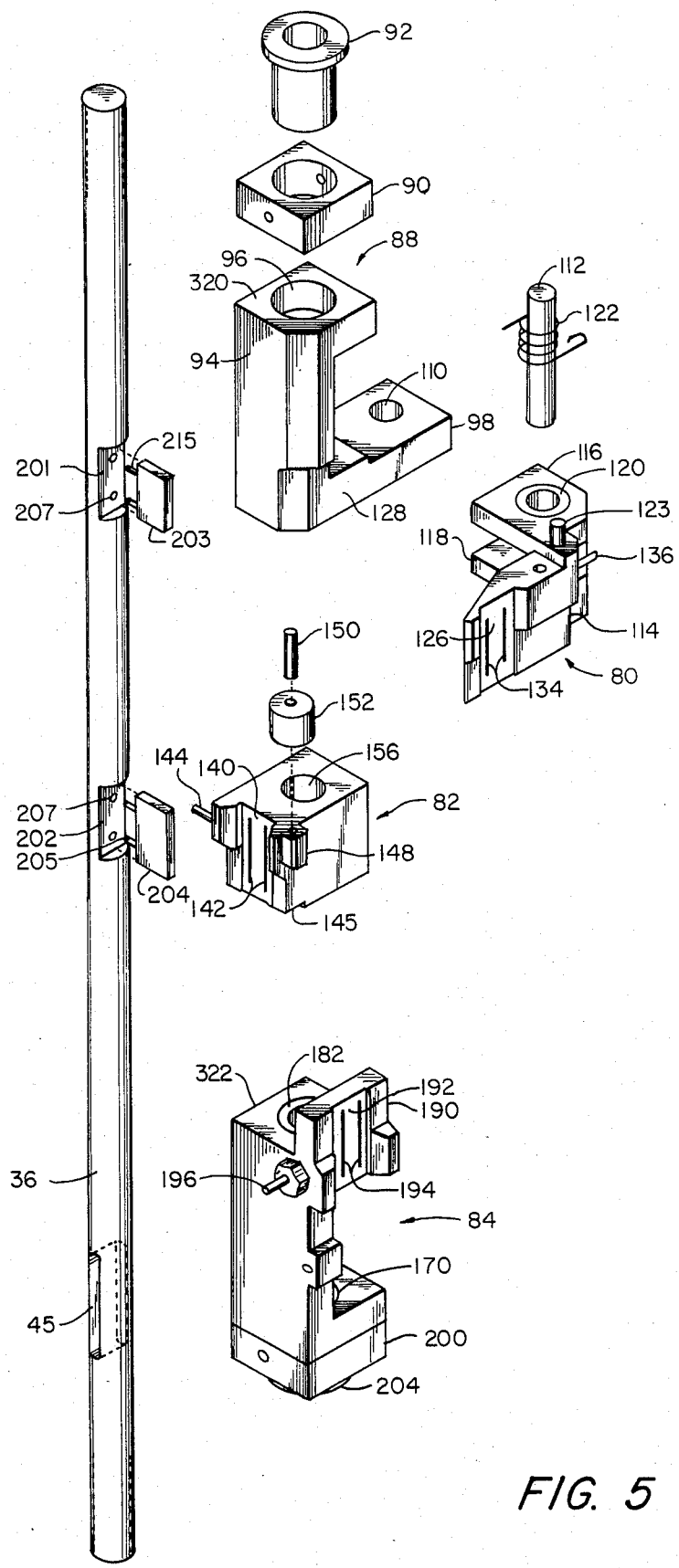
FIG. 5 is an exploded view of the three shift blocks and the shaft on which they are mounted.

As seen in FIGS. 4 and 5, shift block support member 88 and shift blocks 82 and 84 are mounted in tandem on shaft 36, with shift block 82 being affixed to shaft 36 as previously noted, while support member 88 and shift block 84 are free to rotate and also slide relative to the shaft. Support member 88 is mounted on shaft 36 between shift block 82 and the arm 40 of yoke 38, while the lower shift block 84 is slidably and rotatably mounted on shaft 36 between shift block 82 and lower arm 42 of yoke 38 (see FIGS. 1-5). Referring now to FIG. 5, shaft 36 has two flat recesses 201 and 202. Disposed in recesses 201 and 202 are flat stop plates 203 and 204. Each stop plate is secured to shaft 36 by a pair of pins 205 that are press-fitted in two holes 207 that extend diametrically through shaft 36. Stop plates 203 and 204 are aligned with one another and extend radially from shaft 36. Stop plate 203 is set so as to engage set screw 102 or the flat surface 206 of support member 88 and thereby limit rotation of the support member on shaft 36 to a ninety degree angle. Stop plate 204 coacts similarly with set screws 198 and 199 to limit rotation of shift block 84 on shaft 36 to an angle of ninety degrees.

Referring now to FIG. 4, attached to the upper arm 40 of yoke 38 is a bracket 210 which serves as a fixed support for a pneumatic actuator 212. Affixed to the outer end of its piston rod 214 is an attachment member 216 carrying a fixed pivot pin 218. Pin 218 extends into a pair of elongated holes formed in the opposite side portions of a clevis 220 attached to one end of a lever 224 that extends through an oversized aperture 225 in the intermediate section 43 of yoke 38. Lever 224 is pivotally mounted to yoke 38 by a pivot pin 226. The opposite end of lever 224 is provided with a U-shaped clevis 228 having flat inner surfaces that embrace two flat parallel and opposite side surfaces of collar 90. The two arms of clevis 228 have elongated holes which are sized to slidably receive a pair of short pivot pins 230 that are secured in blind holes in collar member 90. Pneumatic actuator 212 serves to pivot lever 224 so as to shift support member 88 and shift block 80 axially along shaft 36. In FIG. 4, piston rod 214 is shown in its retracted position, with the result that support member 88 and shift block 80 are in the lowermost of first and second predetermined limit positions. The second limit position is when piston rod 214 is extended, in which event collar member 90 is stopped by the upper arm 40 of yoke 38.

As seen in FIGS. 4 and 9, a second like pneumatic actuator 240 is secured in lever bar 50. The piston rod 242 of actuator 240 is provided with an attachment member 244 similar to attachment member 216. A pivot pin 246 carried by attachment member 244 is slidably received in elongated openings in a clevis 250 carried by a second lever 252. The latter extends through an oversized hole 254 in yoke 38 and is pivotally attached thereto by a pivot pin 256. The opposite end of lever 252 has a clevis 260 identical to clevis 228. Clevis 260 embraces two flat and parallel opposite surfaces of collar 200 and is pivotally attached to it by a pair of short pivot pins 262 that are secured in blind holes in the collar and extend into elongated holes in the two arms of the clevis that are sized to slidably receive the pivot pins. In FIG. 4 pneumatic actuator 240 is illustrated with its piston rod 242 retracted, with the result that the lower shift block 84 is in the upper of two limit positions in engagement with the middle shift block 82. The other or bottom limit position of shift block 84 occurs when piston rod 242 is extended so as to cause collar member 200 to engage the lower arm section 42 of yoke 38.

Referring now to FIGS. 2-4 and 8, yoke member 38 additionally supports two pneumatic actuators 270 and 272. This is accomplished by means of two rigid struts 276 and 278 that are affixed to and extend at a right angle to the spine portion 43 of yoke 38. Attached to the outer ends of struts 276 and 278 are U-shaped bracket members 280 and 282 that support pivot shafts 284 and 286 respectively. The outer ends of actuators 270 and 272 are provided with yokes 288 and 290 that embrace pivot shafts 284 and 286 and are pivotally attached thereto by pivot pins 291 and 292.

The piston rods 294 and 296 of actuators 270 and 272 are provided at their outer ends with clevises 300 and 302 respectively that are pivotally coupled to pivot pins 304 and 306 that extend through like pivot shafts 308 and 310 rotatably mounted to identical U-shaped brackets 314 and 316 respectively. These brackets are secured to the flat rear surfaces 320 and 322 (FIG. 5) of shift block support member 88 and lower shift block 84, respectively. It is to be noted that rear surface 320 extends parallel to flat recessed front surface 128, while rear surface 322 extends parallel to the flat recessed tape support surface 192. Consequently when piston rods 294 and 296 of actuators 270 and 272 are retracted, rear surfaces 320 and 322 of support member 88 and shift block 84 extend parallel to one another and in parallel confronting relation with the inner flat surface 45 (FIG. 4) of yoke 38.

Referring now to FIGS. 3 and 4, affixed to insert panel 6 by a bracket 326 is a pneumatic actuator 328. Its piston rod 330 is connected to collar 48. When a positive air pressure differential is applied to the upper end of the cylinder of actuator 328, its piston rod 330 will be extended so as to shift shaft 36 to a lower limit position determined by engagement of collar 48 with bearing block 32. When a reverse positive air pressure differential is applied to the actuator, piston rod 330 will be retracted so as to shift shaft 36 to it upper limit position determined by engagement of collar 49 with bearing block 34.

CASSETTE TRANSPORT MECHANISM

Turning now to FIGS. 2, 3 and 8, the cassette transport mechanism 14 is designed to receive a C-Zero cassette discharged from magazine 12 and transport that cassette to a predetermined cassette-loading position adjacent the shift block assembly.

Although not shown, it is to be understood that magazine 12 includes a cassette feeder mechanism that is adapted to discharge C-Zero cassettes on command one at a time into holder 340 (hereinafter described) of cassette transport medium 14. Details of the cassette feeder mechanism are not provided since the feeder may take various forms known to persons skilled in the art and the form of cassette feeder is not critical or essential to the invention. Preferably, and by way of example, magazine 12 may have a cassette feeder mechanism made in accordance with the arrangement described and illustrated in U.S. Pat. No. 4,486,262, issued Dec. 4, 1984 to George M. Woodley for Cassette Loading Machine.

Cassette transport mechanism 14 comprises a cassette holder 340 that is open at its top and left hand ends (as viewed in FIG. 1) and comprises a front wall 342, an end wall 344, and a bottom wall 346. The upper ends of its front and end walls are shaped so as to form a flared top opening for receiving a cassette discharged from magazine 12. The bottom wall of the holder is provided with a spring-biased, pivotally mounted fence 348 at its outer end, i.e., the left hand end as viewed in FIG. 3. Fence 348 is capable of pivoting counterclockwise (as viewed in FIG. 3) to a generally horizontal position so as to allow the cassette to be removed from the holder for loading purposes.

The holder 340 is mounted on a support arm 350 (FIG. 2) that has a horizontal extension 352 (FIG. 8) that projects through a horizontal slot 354 in insert plate 6 and is attached to a slide block 356 slidably supported on a pair of slide rods 358 and 360 whose opposite ends are secured in a pair of support plates 362 and 364 affixed to the rear side of front panel 4. Also attached to support plate 364 is a pneumatic actuator 366. The piston rod 368 of actuator 366 extends through an oversized hole in support plate 364 and is secured to slide block 356. Piston rod 368 normally is extended so that slide block 356 is engaged with support plate 362, thereby locating holder 340 below magazine 12, as shown in FIG. 2. When piston rod 368 is retracted so as to cause slide block 350 to engage support plate 364, holder 340 will be located in position for the C-Zero cassette which it supports to be engaged by the takeup spindle of the cassette holding and positioning mechanisms hereinafter described.

MOVABLE CASSETTE HOLDING AND POSITIONING MECHANISMS

Turning now to FIGS. 2, 3, and 8–12, the flat traverse carriage plate 15 is mounted in front of cutout 7 for reciprocal horizontal movement (as viewed in FIGS. 2 and 8) by an arrangement comprising a pair of slide rods 375 and 376. The opposite ends of rod 375 are anchored in an L-shaped support member 377 affixed to the rear side of insert plate 6, while the opposite ends of slide rod 375 are anchored in support members 378 and 379 affixed to the rear side of insert plate 6. Rods 375 and 376 make a close sliding fit in three slide bearing units 383, 384, and 385 (FIG. 8) attached to the rear side of transverse carriage plate 15, so as to allow the latter to move easily relative to insert plate 6. Reciprocating movement of traverse carriage plate 15 is accomplished by a pneumatic actuator 386 that is affixed to the rear side of that plate and has its piston rod 388 secured in an L-shaped bracket 390 affixed to the rear side of insert plate 6. When piston rod 388 is retracted, traverse plate 15 is disposed in a first limit position located a selected distance from the right hand edge of cutout 7 (as viewed in FIG. 3), and when the piston rod is extended, the traverse carriage plate is disposed in a second limit position located a predetermined distance closer to the left hand side of cutout 7 (as used in FIG. 3) and set so as to position a C-Zero cassette delivered by holder 340 with its leader engaging or located very close to the recessed tape supporting surfaces 126 and 192 of shift blocks 80 and 84.

The first limit position of traverse plate 15 is its "reset" position since that is the position it occupies when the machine is at the beginning of a cassette loading cycle. The second limit position of traverse plate 15 is its "cut" position since that is the position it occupies when the leader tape of a cassette is being cut.

The positioning of traverse plate 15 is also controlled by a second pneumatic actuator 392 affixed to the rear side of that plate directly above actuator 386, and a second L-shaped bracket 394 attached to insert plate 6 directly above bracket 390. The piston rod 396 of actuator 386 is free to move toward and away from bracket 394. Piston rod 396 is normally retracted (FIG. 8) and in that position, it is spaced from the rearward projecting portion of bracket 394 regardless of whether plate 15 is in its first or second limit position. Actuator 392 functions to prevent actuator 386 from shifting plate 15 to its first limit position (FIGS. 3 and 8). Actuator 392 is located so that extension of its piston rod 396 when actuator 386 is operated to shift plate 15 to the left (as seen in FIG. 8), will function (by engagement with bracket 394) to stop the traverse plate in a third position intermediate its first and second limit positions. This third intermediate position is its "wind" position since that is the position it occupies during winding of tape into a cassette. This third intermediate position also facilitates manipulation of the cassette leader as required for a cassette loading operation.

Figure 10:
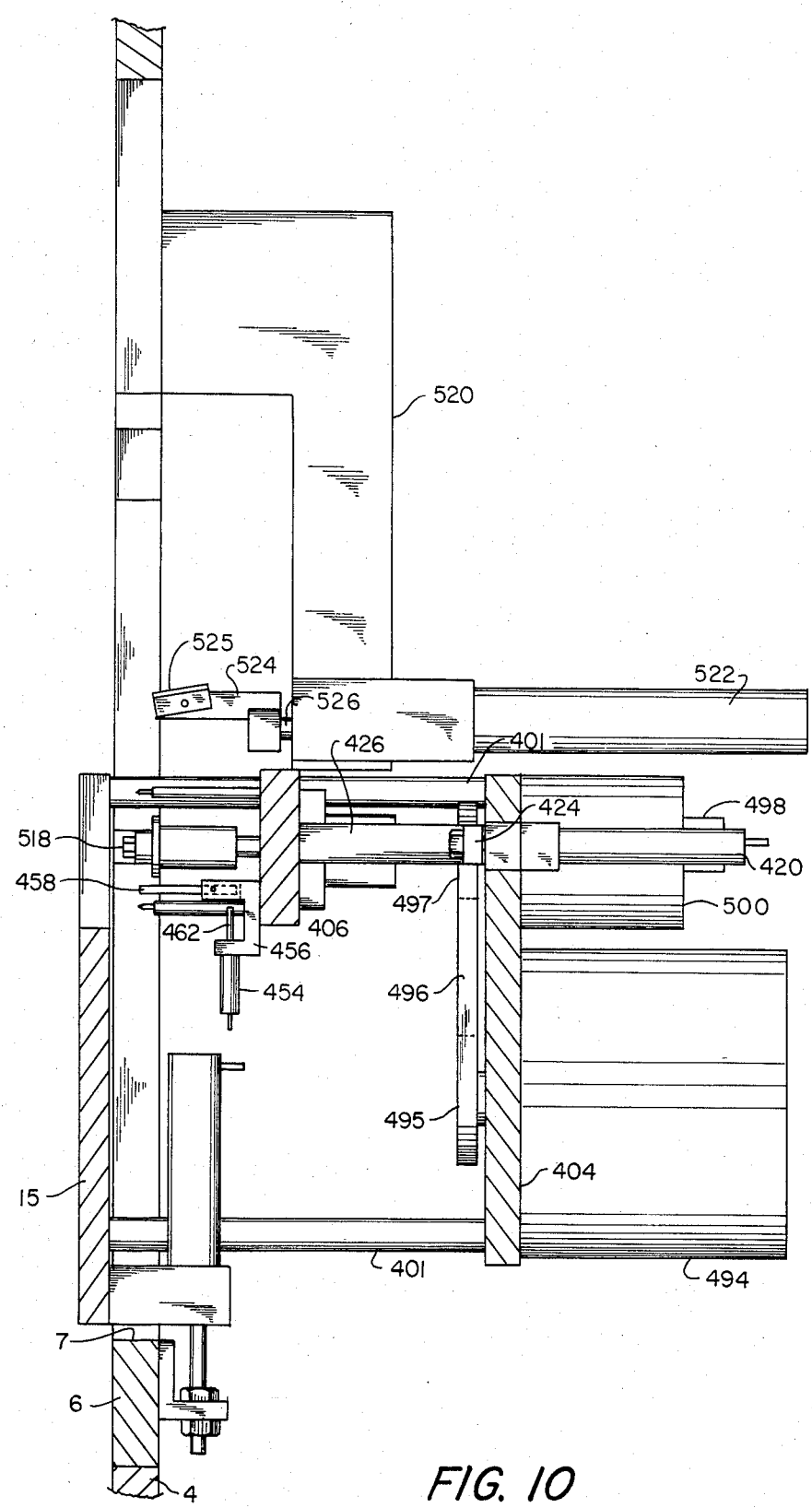
FIG. 10 is a plan sectional view taken along line 10—10 of FIG. 8, with certain members omitted for clarity.
Figure 11:
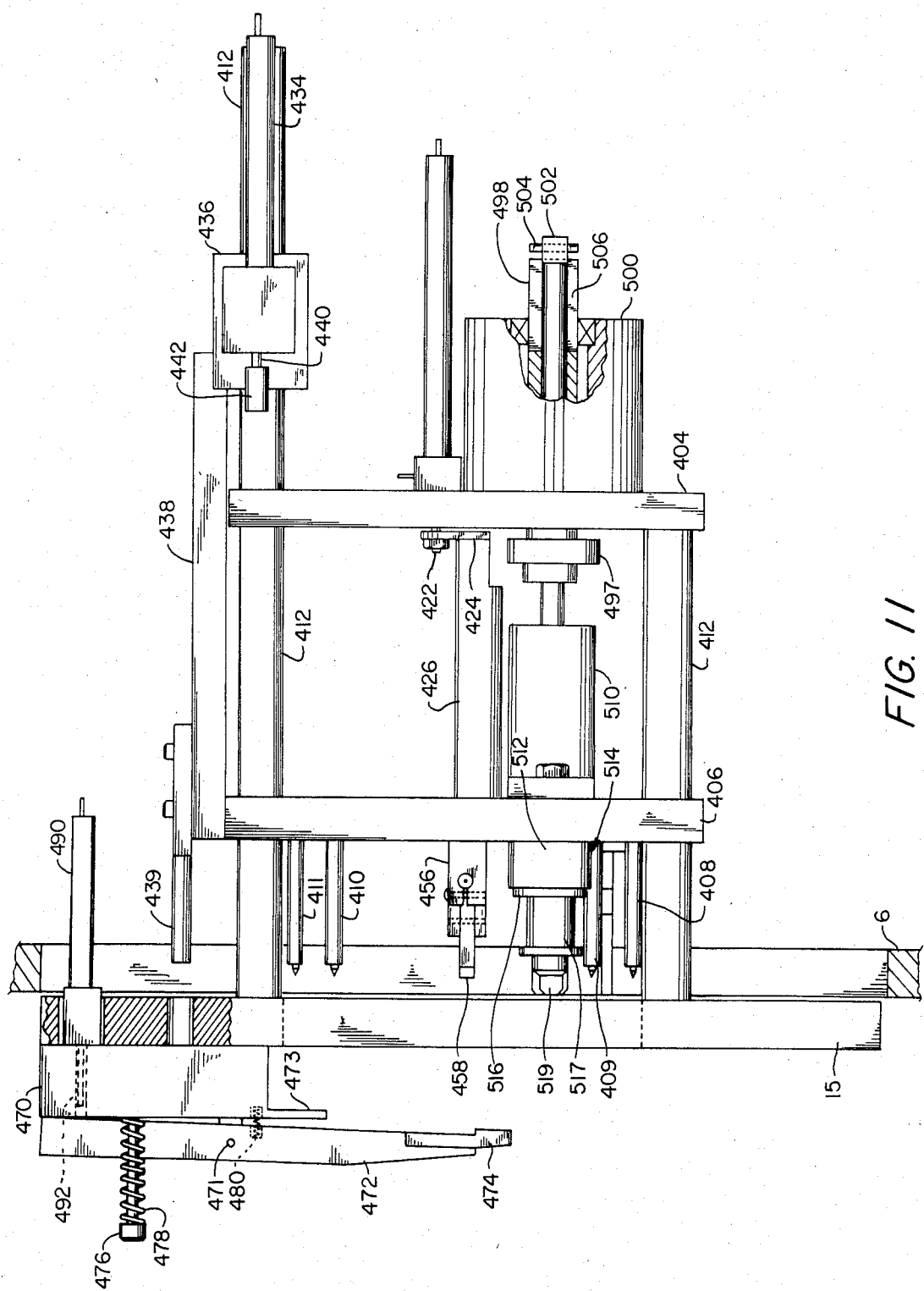
FIG. 11 is a side elevation, partly in section, illustrating portions of the traverse plate and takeup spindle assembly.
Figure 12:
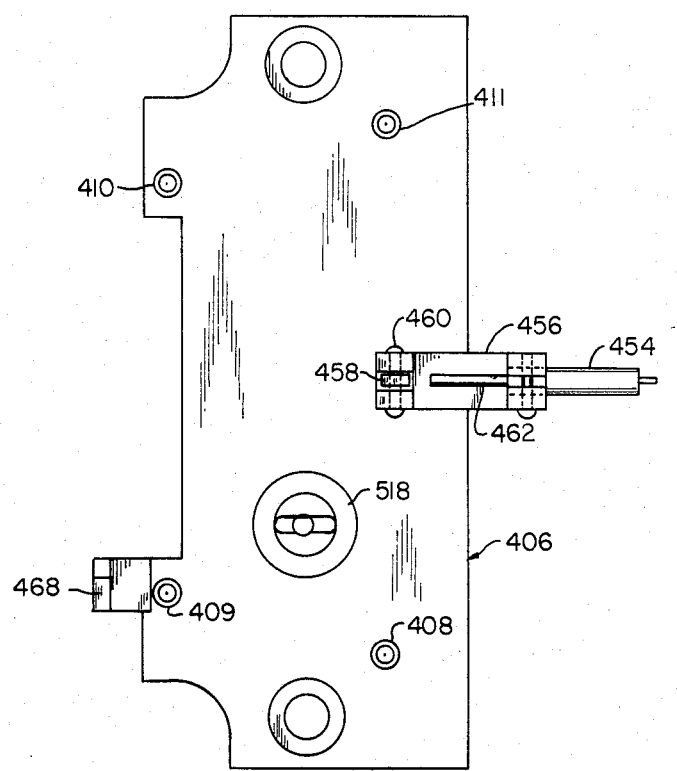
FIG. 12 is an enlarged front view of a portion of the takeup spindle assembly.

Referring now to FIGS. 8, 10 and 11, attached to traverse carriage plate 15 by means including four standoff rods 401 is a motor support plate 404. Mounted intermediate traverse carriage plate 15 and motor support plate 404 is a shift plate 406. The latter is slidably mounted on a pair of slide rods 412 (FIG. 11) that are affixed at one end to plate 15 and at the other end to to motor support plate 404. Motor support plate 404 and shift plate 406 serve as supports for a takeup spindle assembly hereinafter described and also for other devices required to properly locate and condition a C-Zero cassette for a tape loading operation. More specifically, attached to and projecting forwardly from shift plate 406 are four cassette locater pins 408, 409, 410 and 411 (FIGS. 10–12) that are adapted to mate with the four locater holes 611–614 in the rear side of the cassette to be loaded. The forward ends of pins 408–411 are tapered and are reduced in diameter so as to forms shoulders 412 (FIGS. 11 and 12) that engage the rear surface of the 8 mm C-Zero cassette to be loaded and thus limit penetration of the pins into the cassette locater holes.

Shift plate 406 is adapted to be located selectively in three different positions by means that include two pneumatic actuators 420 and 434 (FIGS. 8 and 11). Actuator 420 is attached to the rear side of motor support plate 404 and its piston rod 422 extends through an oversized hole in that plate and is attached to an arm 424 attached to a strut 426 that is affixed to the rear side of shift plate 406. When piston rod 422 is fully retracted (FIG. 11), shift plate 406 is disposed behind insert plate 6 in its first limit position, wherein locater pins 408–411 are located behind traverse plate 15. This first limit position is called the "reset" position since that is the position of the shift plate when the machine is at the beginning of a cassette loading cycle. When piston rod 422 is fully extended, shift plate 406 is in a second or forward limit position that is forward of the position shown in FIG. 11. In this second limit position, locater pins 408–411 project through a generally rectangular aperture 430 (FIG. 3) in traverse plate 15 and permit a cassette engaged by those pins to cause a cassette clamp mechanism hereinafter described to move forwardly away from traverse plate 15 while acting to hold the cassette against the shoulders 212 of locater pins 408–411. This second limit position of shift plate 406 is called the "splice" position since it facilitates holding the leaders on the shift blocks while conducting a splicing operation.

The other actuator 434 is mounted to a support plate 436 attached to the rear end of an outrigger bar 438 that extends over and is spaced from motor support plate 404, and has its forward end attached to shift plate 406. The free end of piston rod 440 of actuator 434 is fitted with an enlarged head 442 for engagement with the rear side of motor support plate 404. When piston rod 440 is retracted, its head 442 is spaced from plate 404 sufficiently for it not to engage that plate when the piston rod 422 of actuator 420 is fully extended. However, when piston rod 440 is fully extended, its head 442 will engage motor support plate 404 and thereby stop movement of shift plate 406 in a third intermediate position in which a cassette mounted on locater pins 408–411 is held against shoulders 412 by the cassette clamp mechanism hereinafter described without the latter being shifted forwardly away from traverse plate 15. This intermediate position of shift plate 406 is called the "wind" position since winding is conducted when the shift plate is in that position.

Referring now to FIGS. 2, 3, 6 and 7, a cassette door-unlocking mechanism is attached to carriage plate 15 at the bottom of its opening 430. The cassette door-unlocking mechanism may be a solenoid type device but preferably it comprises a pneumatic actuator 446. Normally, its piston rod 450 is retracted so that it is flush with or slightly behind the front surface of traverse plate 15. When piston rod 450 is fully extended, it will engage and depress the door unlocking member 608 of a C-Zero cassette supported by locater pins 408–411.

Referring again to FIGS. 3, 10 and 12, a cassette hub-unlocking mechanism is carried by shift plate 406. The hub-unlocking mechanism may embody a solenoid-type actuator, but preferably it comprises a small pneumatic actuator 454 mounted to one end of a U-shaped support block 456 attached to the front side of shift plate 406. A hub-unlocking lever 458 is pivotally mounted by a pivot pin 460 at the other end of U-shaped support block 456. Actuator 454 is mounted so that its piston rod 462 extends toward the rear end of lever 458. Normally, piston rod 462 is retracted so as to be spaced from lever 458. When it is extended, it will engage the rear end of lever 458 and cause it to pivot counterclockwise (as viewed in FIG. 10). If piston rod 462 is extended while a cassette is supported on locater pins 408–411, the forward end of lever 458 will swing into engagement with the hub-unlocking member 610 of the cassette and move member 610 to its hub-unlocking position, thereby freeing the cassette hubs for rotation.

Also carried by shift plate 406 is a door opening bar 468 that extends forwardly at a right angle to traverse plate 15. Bar 468 is arranged so that it will engage the edge of the door 606 of a cassette mounted on locater pins 408–411 just after the door has been unlocked by operation of actuator 446, and will hold that door open so long as shift plate 406 is in its forward limit position or its intermediate position as determined by shift plate actuators 420 and 434.

Referring now to FIGS. 3 and 11, attached to the front side of traverse plate 15 is a pivot mount 470, to which is pivotally mounted at 471 a clamp lever 472 having a cassette holding portion 474 at its bottom end. Clamp lever 472 is provided for the purpose of clamping a C-Zero cassette to traverse plate 15. Pivot mount 470 has a depending lip or flange 473 spaced from traverse plate 15 that acts as a top guide for the cassette to be loaded. Pivot mount 470 is slidably mounted on two parallel support rods 476 attached to traverse plate 15 and is biased toward plate 15 by compression springs 478 (FIG. 11) on rods 476. Rods 476 have a length such as to permit mount 470 to move away from the traverse plate a distance equal to that between the second limit position and the intermediate position of shift plate 406. A compression spring 480 (FIG. 11) between pivot mount 470 and the lower end of clamp lever 472 urges the clamp lever to pivot so as to urge its cassette holding portion 474 away from traverse plate 15. A pneumatic clamp-releasing actuator 490 is attached to the rear side of pivot mount 470. The piston rod 492 of actuator 490 extends through an oversized hole in the traverse plate located directly behind the clamp lever. When piston rod 492 is retracted, the position of clamp lever 472 is determined by spring 480. When the piston rod of actuator 490 is extended, clamp lever 472 is forced to pivot so as to shift its cassette holding portion 474 toward traverse plate 15. Pivot mount 470 is adapted to limit pivotal movement of the clamp lever on its pivot 471.

TAKEUP SPINDLE DRIVE ASSEMBLY

Motor support plate 404 and shift plate 406 act as supports for a takeup spindle drive assembly which is illustrated in detail in FIGS. 3, 8 and 10–12. A takeup motor 494 is affixed to the rear side of plate 404. The output shaft of motor 494 extends through an oversized hole in plate 404 and has a pulley 495 attached to its outer end. A belt 496 extends around pulley 495 and a second pulley 497 attached to a hollow shaft 498. The latter is rotatably mounted in a bearing assembly 500 (FIG. 11) that is attached to motor support plate 404. Slidably mounted in hollow shaft 498 is a shaft 502 having at its rear end a diametrically mounted pin 504 whose opposite ends project into a diametrical slot 506 in hollow shaft 498. Pin 504 and slot 506 coact to cause shaft 502 to rotate with hollow shaft 498, while permitting the former to slide axially within the latter.

Shaft 502 is rotatably and slidably mounted in a bearing unit 510 attached to shift plate 406 and its forward end is coupled to a first section 512 of an electromagnetic clutch unit 514 affixed to shift plate 406. A second section 516 of the same clutch supports a takeup spindle 517 that is provided with a hub adapter 518 configured to make a driving engagement with the lower hub of a cassette disposed in tape loading position. Clutch 514 is normally deenergized, whereby its output section 516 is free to rotate relative to its input section 512. When the clutch is energized, its output section is clutched to its input section, so that takup spindle 517 will rotate with shaft 502.

TAPE CUTTER MECHANISM

Referring now to FIGS. 8 and 10, an L-shaped arm 520 is attached to the rear side of insert plate 6. Affixed to arm 520 is a pneumatic actuator 522 having a cutter assembly 524 attached to the outer end of its piston rod 526. Cutting assembly 524 has a cutter blade 525 that extends in a horizontal plane (as viewed in FIGS. 2 and 3). Actuator 522 is positioned so that (a) when piston rod 526 is fully retracted (FIG. 10), cutter assembly 524 is located in or behind insert plate 6, and (b) when piston rod 520 is extended, cutter 525 will move through traverse plate 15 along a predetermined cut line 527 (FIGS. 17A, 17E). When piston rod 520 is extended, the cutter blade will either (1) enter a narrow gap that is formed between shift blocks 80 and 84 if the latter are positioned as shown in FIGS. 4, 17A and 18A, whereby to cut a leader tape extending between those shift blocks, or (2) enter a narrow gap that is formed between shift blocks 82 and 84 by recess 145 if the latter blocks are positioned as shown in FIGS. 17E and 18E, whereby to cut a use tape extending between those shift blocks.

SPLICER MECHANISM

Figure 13:
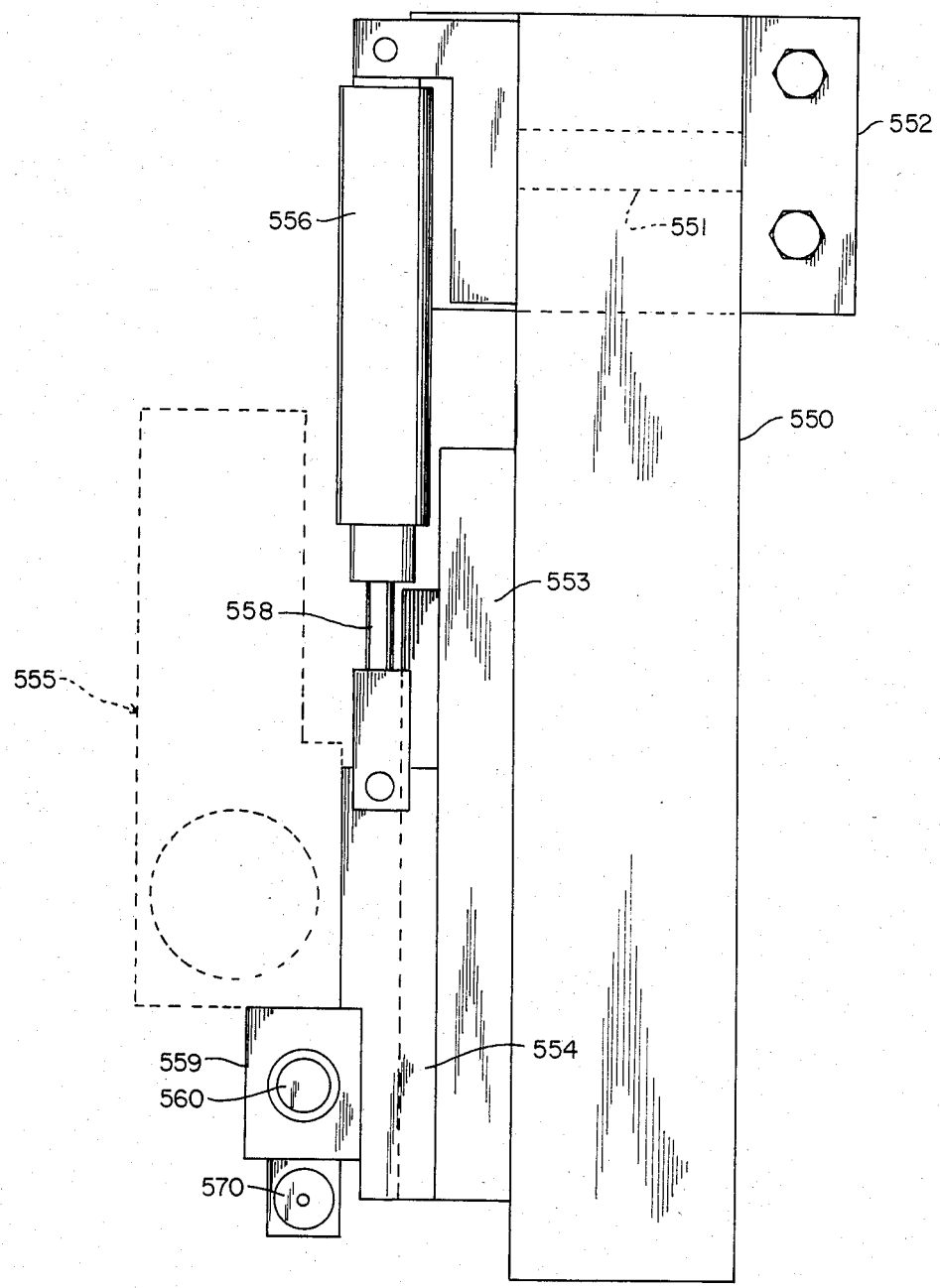
FIG. 13 is an enlargement of a portion of FIG. 2 showing the splicer mount assembly.
Figure 14:
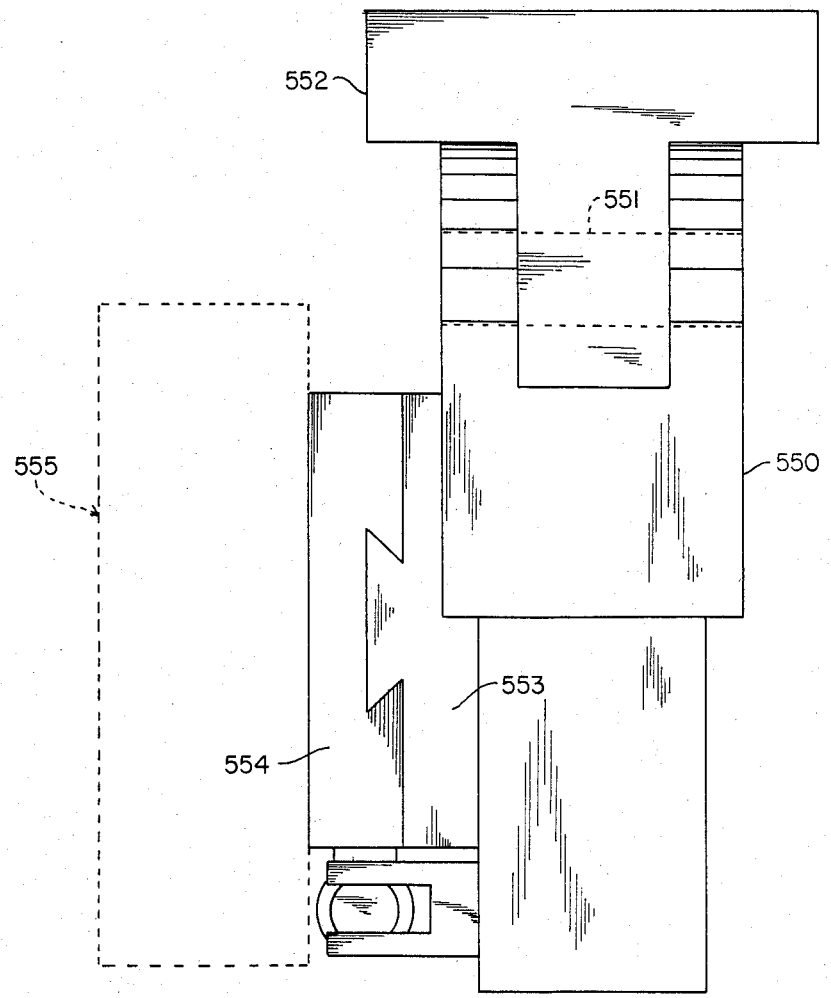
FIG. 14 is a plan view of the splicer mount assembly.
Figure 15:
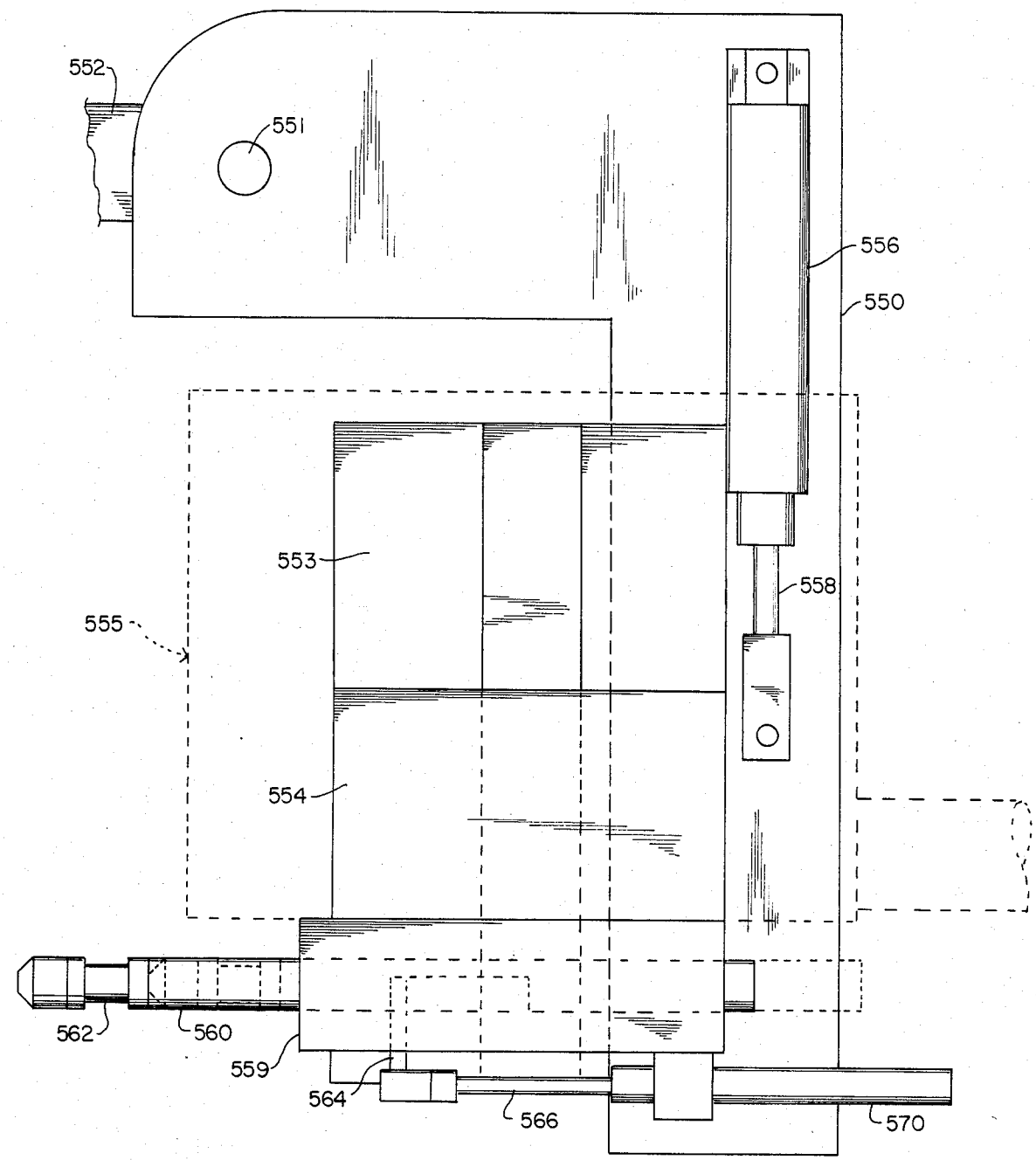
FIG. 15 is a side elevation of the splicer mount assembly.

Referring now to FIGS. 2 and 13–15, attached to the front side of the machine console is a splicer mount assembly comprising a support plate 550 pivotally mounted at 551 to a pivot mount 552 affixed to insert panel 6. A mount plate 553 is affixed to support plate 550 and a slide block 554 is slidably mounted to mount plate 553 by a tongue and groove arrangement so as to be capable of reciprocal movement on a vertical axis, i.e., an axis extending vertically parallel to insert plate 6 (as viewed in FIG. 1). A splicer 555 of conventional design is attached to slide block 554. A pneumatic actuator 556 is affixed to support plate 550 and has its piston rod 558 pivotally attached to slide block 554. Reciprocal movement of piston rod 558 will cause slide block 554 to move between first and second predetermined vertically-spaced splicing positions. Details of splicer 555 are not illustrated or described since the splicer may take various forms. Preferably, it is a splicer of the kind having a reciprocal tape-applying plunger or member to which splicing tape is held by suction until it is deposited on the abutting ends of two tapes to be spliced, e.g., a splicer of the kind disclosed in U.S. Pat. Nos. 3,753,835, 4,364,791, 4,385,959, 4,430,145, 4,462,858, 4,475,970, 4,478,674, 4,486,262 or 4,599,130. The splicer support plate 550 normally is positioned as shown in FIGS. 13 and 15, whereby splicer 555 is oriented so as to be able to apply splicing tape to leaders and use tape supported on the shift blocks. The pivot connection 551 allows support plate 550 to be pivoted so as to swing splicer 555 outwardly and upwardly away from the shift block assembly, as may be required to facilitate inspection of the tapes supported on the shift blocks.

AUXILIARY TAPE GUIDE ROLL

Affixed to the bottom end of slide block 554 is a block 559 within which is slidably and rotatably disposed a shaft 560 having at its forward end a rotatable tape guide roll 562. Shaft 560 is connected by an arm 564 to the piston rod 566 of a pneumatic actuator 570 that is affixed to the bottom side of block 559. When piston rod 566 is extended, guide roller 562 will extend between the leader tape attached to lower shift block 84 and a C-Zero cassette located in loading position. Normally, actuator 570 is conditioned so that piston rod 566 is retracted, whereby guide roller 562 is spaced forwardly (to the right as shown in dotted lines in FIG. 15) of insert panel 6 and traverse plate 15.

CASSETTE COLLECTION ASSEMBLY

The cassette collection assembly 16 (FIGS. 2 and 3) is attached to front panel 4 between insert panel 6 and includes an inclined chute 580 (FIG. 3) whose upper end terminates at a point directly below clamp lever 472. Chute 580 functions to intercept and collect loaded cassettes which fall down from the loading station after clamp lever 472 is moved to release position.

SUPPLY REEL DRIVE ASSEMBLY AND TAPE COUNTER

Referring now to FIG. 2, the supply reel shaft assembly 26 is driven by a supply reel servomotor 588 mounted behind front panel 4. Use tape 25 paid off of supply reel 24 passes over a guide roll 590, a tape counter roll 591, and a guide roll 593 (all rotatably attached to front panel 4) to a slack takeup roll 595 that is mounted for reciprocal movement along an arcuate slot 596 in front panel 4. The use tape passes from slack takeup roll 595 over a pair of guide rolls 597 and 598 (also mounted to front panel 4) down onto the middle shift block 82. Although not shown, it is to be understood that tape counter roll 591 is attached to a tachometer or other type of revolution counter, e.g., as disclosed in U.S. Pat. Nos. 3,997,123 and 4,436,251, so that as tape 25 is transported, electrical signals are generated that indicate the length of tape being wound into the C-Zero cassette. The slack takeup roll 595 preferably forms part of a tape winding system such as is disclosed in U.S. Pat. No. 4,436,251, which also discloses how movement of a slack takeup roll is used to control tape tension and tape winding speed.

MACHINE CONTROL SYSTEM

Figure 16:
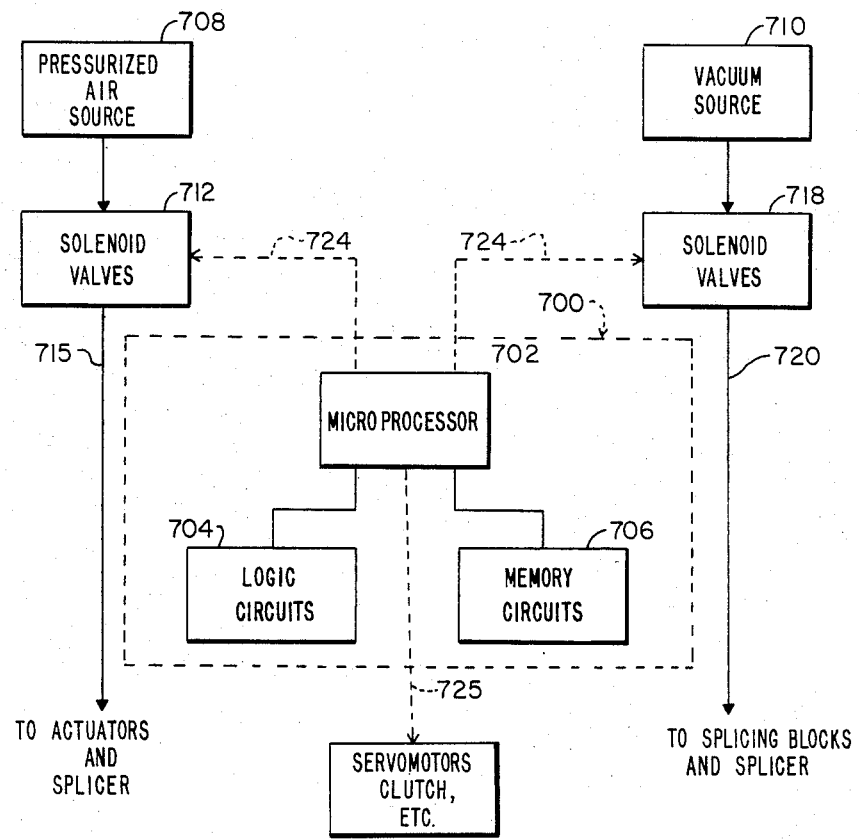
FIG. 16 is a schematic diagram of the control system of the same loading machine.
Figure 17B:
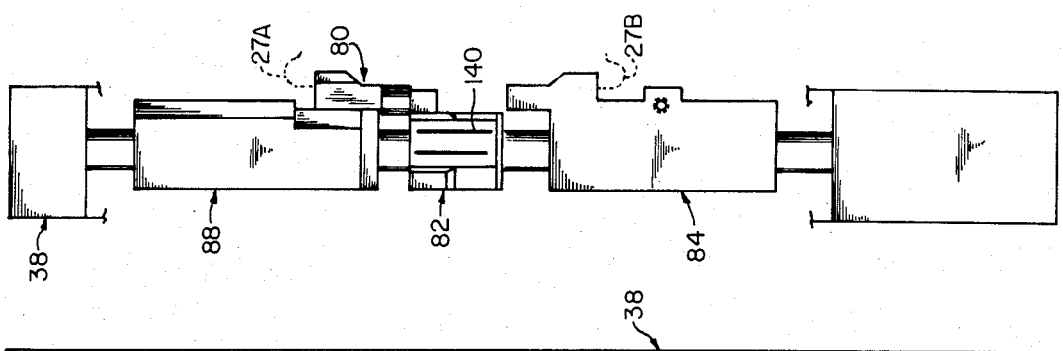

FIG. 16 schematically illustrates the control system for the machine. The control system comprises a programmable controller 700 which preferably comprises a microprocessor 702 and associated logic and memory circuits 704 and 706. Additionally, the control system comprises a source of pressurized air 708, a vacuum source 710, a first plurality of solenoid valves 712 connected by hose lines 714 and 715 so as to control the flow of pressurized air from source 708 to the various actuators hereinabove described, and also splicer 555, a second plurality of solenoid valves 718 connected by hose lines 719 and 720 so as to control the application of suction by vacuum source 518 to the hose fittings (hereinabove described) of shift blocks 80, 82 and 84, and also, as required, to splicer 555, a plurality of electrical circuit lines 724 for transmitting electrical signals from the programmable controller to the individual solenoid valves, and a plurality of electrical circuit lines 725 for transmitting signals between the programmable controller and the other electrical components of the machine, such as servomotors 494 and 588, clutch 514, the tachometer (not shown) associated with tape counter roll 591, and other electrical components of the tape winding system (not shown) associated with slack takeup roll 595.

The microprocessor 702 of programmable controller 700 is programmed so as to cause the machine to operate in the manner hereinafter described. Details of the microprocessor computer program are not provided since (1) programming of a microprocessor is a well-known art, (2) the specific form of the program will vary according to the kind or model of microprocessor used in the programmable controller and the programming language used in preparing the computer program, (3) the nature and form of the program will be obvious to a person skilled in the art from the following detailed description of the operation of the machine, and (4) the timing aspects of the program will vary according to the response characteristics of the various pneumatic and electrical devices employed in the machine. Also, while takeup motor 494 and supply reel motor 588 preferably are operated in accordance with the invention disclosed in U.S. Pat. No. 4,436,251, it is to be understood that operation of those motors may be controlled by some other motor control system.

MODE OF OPERATION

The mode of operation of the above-described machine will now be described with reference to FIGS. 17A–G and 18A–G, and 19.

Assume that the machine is in its reset or start position (FIGS. 17A, 18A) with the power switch 21 in "On" position, the control system coupled to the air and vacuum sources 708 and 710, and a cassette disposed in holder 340 with the latter located in the position shown in FIG. 2. In this reset or start position, yoke 38 is disposed at a right angle to insert plate 6 as a result of operation of actuator 74. At the same time, the upper shift block assembly 80, 88 is in its down position, i.e., the piston rod of actuator 212 is retracted, and is also rotated so that its recessed tape supporting surface 126 is facing the cassette (the piston rod of actuator 270 is extended). At the same time, the center shift block is disposed so that it is facing forward in the position shown in FIG. 2 (the piston rod of actuator 52 is extended). Simultaneously, vacuum is being applied to the middle shift block 82 so as to hold in place the leading end of a use tape 25 extending down from guide roll 598. The lower shift block is in its up position, as a result of retraction of the piston rod of actuator 240, and is also rotated so that its tape-supporting surface 192 is facing the cassette, as a consequence of the piston rod of actuator 272 being extended. In this reset or start position, center shaft 36 is down, as a result of extension of the piston rod of actuator 328, and yoke 38 is retracted (i.e., at a right angle to insert plate 6) as a consequence of operation of actuator 74. Shift plate 406 and the associated takeup spindle assembly are in their first limit position (the "reset" position) as a result of retraction of the piston rod of actuator 420. The traverse carriage plate 15 is also in its first limit or "reset" position (FIG. 2), as a result of retraction of piston rod 388 of actuator 386. The slide plate 554 supporting splicer 555 is in its lower limit position (the piston rod of actuator 556 is extended).

Operation of the machine is initiated by depressing a start button in the switch bank 22 on the front panel of the machine. Immediately, the piston rod of cassette holder actuator 366 (FIG. 8) is extended so as to position holder 340 in front of the takeup spindle assembly associated with traverse plate 15, and simultaneously the door unlock pin 450 is extended by operation of actuator 446 to unlock the cassette door. Immediately thereafter clamp lever actuator 440 is operated to cause clamp lever 472 to clamp the cassette against the traverse plate 15, and simultaneously shift plate 406 and the associated takeup spindle assembly are extended to their intermediate position (i.e., the wind position) by operation of actuators 420 and 434. As shift plate 406 moves into its intermediate position, locater pins 408–411 enter the locater holes 611–614 in the cassette and force the cassette against the lip 473 of clamp mount 470, and simultaneously (1) door opening bar 468 engages and pushes the cassette door 606 to open position, (2) adapter 518 of takeup spindle 517 enters and drivingly engages the hub 602 of cassette 600, and (3) the hub-unlocking actuator 454 is operated to unlock the hubs of the cassette. Thereafter, holder 340 and the door lock pin 450 are retracted to their at-rest positions. Immediately thereafter traverse plate 15 is extended from its retracted limit position to its forward limit position (i.e., the cut position) by retraction of piston rod 388 of actuator 386, so as to place the cassette leader tape against shift blocks 80 and 84.

Thereafter, vacuum is applied to the upper and lower shift blocks 80 and 84 to attach the leader tape to those shift blocks. Next, cutter assembly 524 is extended to move cutter blade 525 along cut line 527 to cut the leader tape into two leaders 27A and 27B, one held to shift block 80 and the other held to shift block 84, and then the cutter is retracted. Then the upper shift block subassembly 80, 88 is moved up on shaft 36 by operation of actuator 212 and lower shift block 84 is moved down by operation of actuator 240, thereby separating the two leaders 27A and 27B and causing those leaders to form loops extending from the cassette to shift blocks 80 and 84 (see FIGS. 17B, 18B). These loops facilitate the subsequent splicing operations.

Next, the lower shift block 84 is rotated 90 degrees by actuator 272 so that its recessed surface 192 is now facing forward parallel to insert panel 6. At about the same time, shift plate 406 is moved to its forward limit position (the tape splice position) determined by extension of the piston rod of actuator 420. This causes (a) bar 439 to push pivot mount 470 forward away from traverse plate 15 and (b) locater pins 408–411 to move the cassette forward away from traverse plate 15. The cassette remains engaged with lip 473 of pivot mount 470 when shift plate 406 is moved to its forward limit position. This movement of shift plate 406 to its forward limit or "splice" position is conducted to facilitate holding the two leaders on shift blocks 80 and 84.

Figure 18C:
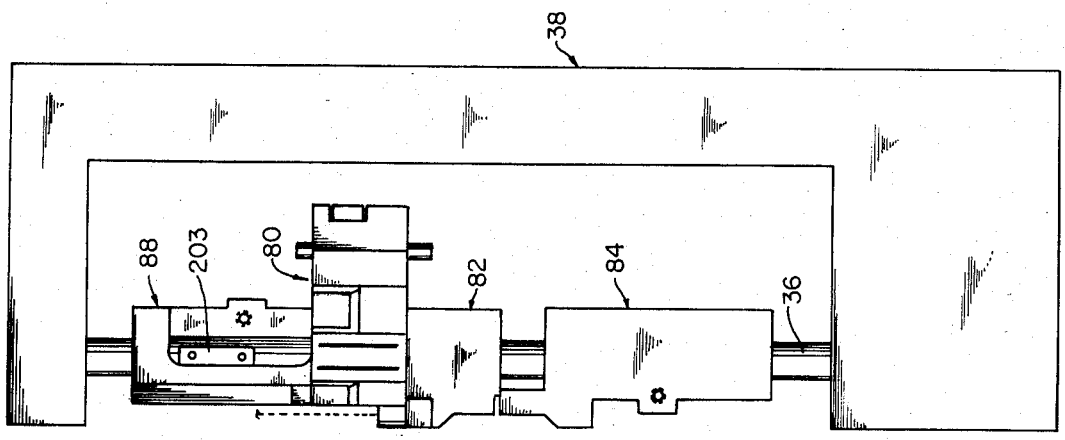
Figure 17C:
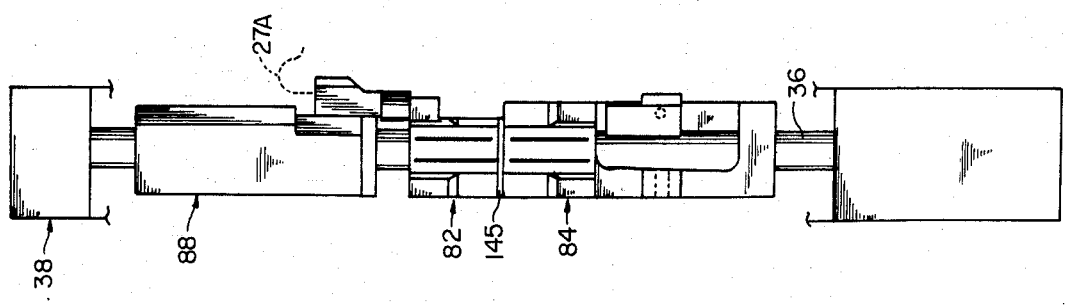

Splicer 555 is then operated to splice the leader on shift block 84 to the leading end of the use tape 25 on shift block 82 (FIGS. 17C, 18C). Thereafter, shift block assembly 80, 88 and shift blocks 82 and 84 are all rotated 90 degrees counterclockwise (as viewed in FIG. 5). This also involves 90 degree rotation of yoke 38 so that it lies parallel to the plane of insert panel 6 (FIGS. 17D, 18D). This rotation of block 82 causes roller 152 to cam block 80 counterclockwise on pivot 112 (FIG. 19) so as to move the upper leader out of the way of the portion of use tape 25 that extends down onto block 82.

Then shift plate 406 and the associated takeup spindle assembly are retracted to the the wind position determined by engagement of the head 442 of actuator 434 with motor plate 404. The traverse plate 15 is then retracted to its intermediate position (i.e., the wind position) determined by engagement of piston rod 396 of actuator 592 with bracket 394, after which the vacuum to the lower and middle shift blocks 82 and 84 is removed. At this time, the lower leader guide roll 562 below splicer 555 is extended so as to be positioned between the lower leader on the lower shift block and the cassette. Once the guide roller is in place, clutch 514 is engaged and servomotors 494 and 588 are energized so as to cause tape to be wound onto the lower hub of the cassette. The microprocessor deenergizes clutch 514 and shuts off the two servomotors when a predetermined amount of tape has been wound into the cassette.

On termination of winding, the lower shift block 84 is moved up by operation of actuator 240. Then shaft 36 is moved up by operation of actuator 328. This is followed by downward movement of the upper shift block assembly 80, 88 and reapplication of vacuum to the middle and lower shift blocks 82 and 84 to draw the use tape against those blocks. Then leader guide roller 562 is retracted and the traverse plate 15 is moved to its forward limit position (the "cut" position). Next the cutter is operated (FIGS. 17E, 18E) to cut the use tape between leader blocks 82 and 84. Then, traverse plate 15 is retracted to its intermediate position (the "wind" position). Thereafter, the lower shift block 84 is moved down and shaft 36 is rotated 90 degrees by actuator 52 (FIG. 4) so that the recessed tape support surface of shift block 82 faces forward. Then, the lower shift block 84 is moved up again by retraction of actuator 240 (FIG. 17F, 18F).

Figure 18G:
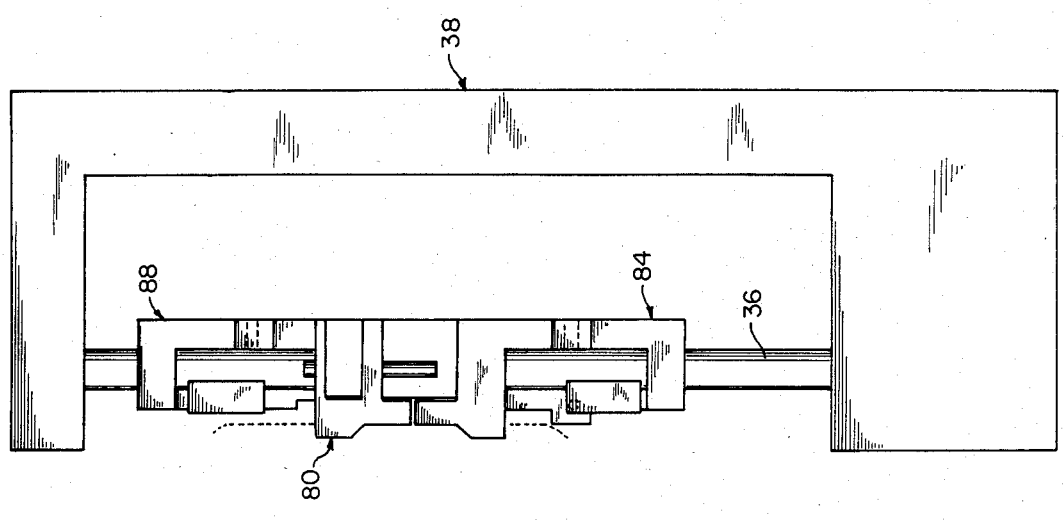
Figure 17G:
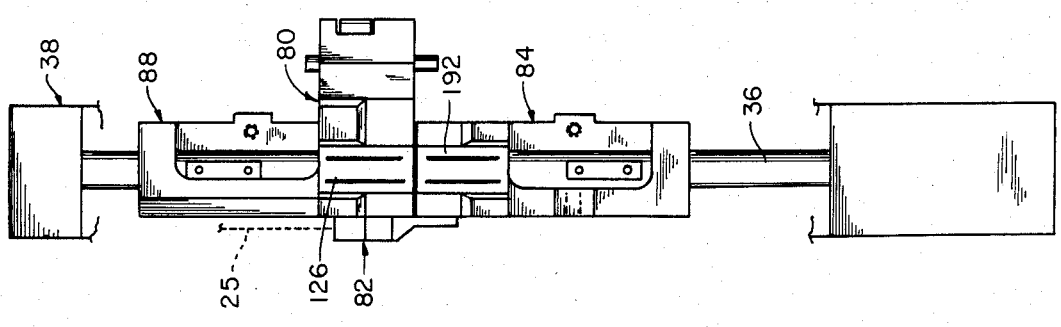

Next, yoke 38 is retracted so that it now extends at an angle of 90 degrees to insert panel 6, and shift plate 406 and the associated takeup spindle assembly are extended to their forward limit position (the "splice" position), as shown in FIGS. 17G and 18G. Splicer slide plate 554 is then moved to its upper limit position and splicer 555 is then operated so that splicing tape is applied to splice together the trailing end of the tape on lower shift block 84 and the leader on shift block 80.

Subsequently, the vacuum to the upper and lower shift blocks is removed. Shift plate 406 and the associated takeup spindle assembly are then retracted to their intermediate position (the "wind" position). Thereafter, clutch 514 and servomotor 490 are activated for a brief period of time sufficient to wind into the cassette the trailing end of the use tape and the upper leader. Then, traverse plate 15 is retracted to its first limit position (the "reset" position). Thereafter, shift plate 406 and the associated takeup spindle assembly are retracted to their first limit position (the "reset" position) to withdraw locater pins 408–411 from the cassette and allow the cassette door to close, and actuator 490 is deactivated so as to cause clamp lever 472 to release the loaded cassette. The released cassette drops down from the machine to the cassette collection platform 16.

Subsequently, the machine is operated so as to produce upward movement of the upper shift block 80 and downward movement of the bottom shift block 84. Simultaneously, the center shaft 36 is moved downward Then, the upper shift block subassembly is rotated 90 degrees by extension of the piston rod of actuator 270, and the lower shift block is rotated in the same direction by extension of the piston rod of actuator 272. Thereafter, the upper shift block is moved down by retraction of the piston rod of actuator 212 and the lower shift block is moved up again by retraction of the piston rod of actuator 240, thereby placing the shift blocks back in the position shown in FIGS. 17A and 18A.

Thereafter, other cassettes may be loaded by causing the machine to repeat the steps hereinabove described.

Obviously, the apparatus shown in FIGS. 1–19 may be modified without departing from the principles of the invention. Thus, for example, means other than pneumatic actuators may be employed to operate the several mechanisms hereabove described. Still other changes will be obvious to persons skilled in the art.

What is claimed is:

1. A shift block assembly for use in splicing tape to leaders comprising:
   means defining a fixed axis;
   a first block mounted for rotational and axial movement on said axis;
   a second block mounted for rotational movement on said axis;
   a third block mounted for rotational and axial movement on said axis; and
   first, second and third selectively operable tape holding means for holding a tape in position on each of said first, second and third blocks respectively.

2. A shift block assembly according to claim 1 wherein said first, second and third selectively operable tape holding means comprise:
   first, second and third tape guide means associated with said first, second and third blocks respectively, suction holes in said first, second and third blocks associated with said first, second and third tape guide means, and means for connecting said suction holes in said first, second and third blocks to a vacuum source.

3. A shift block assembly according to claim 1 further including:
   first selectively operable means for rotating said said first block on said axis between first and second rotational positions;
   second selectively operable means for rotating said second block on said axis between first and second rotational positions corresponding to the first and second rotational positions of said first block; and
   third selectively operable means for rotating said third block on said axis between first and second rotational positions corresponding to the first and second rotational positions of said first and second blocks.

4. A shift block assembly according to claim 3 further including:
   fourth selectively operable means for shifting said first block along said axis between first and second axial positions; and
   fifth selectively operable means for shifting said third block along said axis between first and second axial positions.

5. A shift block assembly according to claim 4 further including:
   means for limiting axial movement of said first block.

6. A shift block assembly according to claim 5 further including:
   means for limiting axial movement of said third block.

7. A shift block assembly according to claim 4 further including:
   means rotatably associated with said first block for rotating said first block on a second axis eccentric to said first axis so as to locate a tape held by said first block out of the path of tape on said second block.

8. A shift block assembly according to claim 1 wherein said axis is determined by a shaft on which said first, second and third blocks are mounted.

9. A shift block assembly according to claim 8 wherein said second block is attached to said shaft.

10. A shift block assembly according to claim 8 wherein said first block comprises a first part rotatably mounted to said shaft and a second part rotatably mounted to said first part, and further wherein said first tape holding means is associated with said second part.

11. A shift block assembly according to claim 10 further including means for causing said second part to rotate relative to said first part when said second tape holding means is moved into alignment with said third tape holding means.

12. A shift block assembly according to claim 10 wherein said first and second blocks are arranged so that in one state of operation said second part of said first block overlaps said second block with said first tape holding means being disposed in a plane that intersects the plane of said second tape holding means.

13. A shift block assembly according to claim 1 wherein said blocks are mounted on a common shaft and are arranged so that in one state of operation said second block lies adjacent to said first and second blocks but its tape holding means is displaced 90 degrees from the tape holding means of said first and second blocks, in a second state of operation said second block lies adjacent said third block and its tape holding means is aligned with the tape holding means of said third block, and in a third state of operation said second block is spaced axially from said third block.

14. A shift block assembly according to claim 1 wherein each of said second and third blocks is rotatable on said axis through an angle of about 90 degrees.

15. A shift block assembly according to claim 2 wherein at least one of said guide means is a tape-receiving groove.

16. A shift block assembly for use in splicing tape to leaders comprising:
   a shaft;
   a first shift block mounted for rotational and axial movement on said shaft, said first shift block having (a) a first tape guide means for supporting a tape and (b) first tape holding means for holding a tape in said first guide means;
   a second shift block mounted on said shaft, said second shift block having (a) a second tape guide means for supporting a tape and (b) second tape holding means for holding a tape in said second guide means;
   a third shift block mounted for rotational and axial movement on said shaft, said third shift block having (a) a third tape guide means for supporting a tape and (b) third tape holding means for holding a tape in said third guide means;
   first actuator means for selectively rotating said first shift block on said predetermined shaft;
   second actuator means for selectively rotating said second shift block relative to said first and third shift blocks;
   third actuator means for selectively rotating said third shift block on said predetermined shaft;
   fourth actuator means for selectively shifting said first shift block along said predetermined shaft between first and second predetermined positions; and
   fifth actuator means for selectively shifting said third shift block along said shaft between first and second predetermined positions.

17. A shift block assembly according to claim 16 further including means for shifting said shaft axially between first and second predetermined axially spaced positions.

18. A shift block assembly according to claim 17 further including means rotatably mounting said shaft to a fixed panel.

19. A shift block assembly according to claim 17 wherein said shaft is rotatable by said second actuator means between first and second predetermined rotationally spaced positions.

20. A shift block assembly according to claim 16 wherein said second shift block is affixed to said shaft so as to rotate therewith, and said second actuator means is connected so as to rotate said shaft between first and second predetermined circumferentially-spaced positions.

21. A shift block assembly according to claim 16 wherein said fourth and fifth actuator means for selectively shifting said first and third shift blocks along said shaft comprises a pair of selectively operable pneumatic actuators.

22. A shift block assembly according to claim 21 having actuator means for shifting said shaft axially between first and second predetermined positions.

23. A shift block assembly according to claim 16 further including:
   a tape cutter assembly comprising a cutter member and means for operating said cutter so as to cut a tape along a line in a predetermined plane; and
   means for operating said first, second, third, fourth and fifth actuator means so that selectively (a) said first and second shift blocks are positioned to abut one another in said predetermined plane or (b) said second and third shift blocks are positioned to abut one another in said predetermined plane.

24. A shift block assembly according to claim 23 further including splicer means for splicing (1) a use tape and a leader tape supported by said first and second shift blocks respectively when said shift blocks are aligned in a first splicing position, and (2) a use tape and a leader tape supported by said second and third shift blocks respectively when said second and third shift blocks are aligned in a second splicing position.

25. A shift block assembly for use in splicing tape to leaders comprising:
   a shaft;
   means mounting said shaft for rotational and longitudinal movement with respect to a fixed axis;
   a first block rotatably and slidably supported by said shaft, said first block having a first guideway for receiving a first tape and means for holding said first tape in said guideway by suction;
   a second block attached to said shaft so as to move therewith when said shaft rotates or shifts axially on said axis; said second block having a second guideway for receiving a second tape and means for holding said second tape in said guideway by suction;
   a third block rotatably and slidably mounted on said shaft, said second block having a third guideway for receiving a third tape and means for holding said third tape in said guideway by suction;
   means for selectively rotating each of said first and third blocks on said shaft between first and second predetermined limit positions;
   means for selectively rotating said shaft and said second block between first and second predetermined angularly spaced limit positions; and
   means for shifting said shaft axially between first and second axially-spaced shaft limit positions.

26. A cassette tape loading machine for loading a use tape into a C-Zero cassette of the type comprising a pair or rotatable hubs and a leader tape extending between said hubs:

means for holding a supply of use tape;

means for holding said C-Zero cassette in a selected loading position so that it may be loaded with a use tape;

a shift block assembly for use in splicing a use tape to first and second leaders formed by cutting said leader tape, said shift block assembly comprising a shaft, means mounting said shaft for rotational and axial movement, a first block rotatably and slidably mounted on said shaft, said first block having a first guideway for supporting a first tape and means for holding said first tape in said first guideway by suction, a second block affixed to said shaft so as to move with said shaft when said shaft is rotated on its axis or moved along its axis, said second block being disposed between said first and third blocks and having a second guideway for supporting a second tape and means for holding said second tape in said second guideway by suction, a third block mounted on said shaft, said third block having a third guideway for supporting a third tape and means for holding said third tape in said third guideway by suction, actuator means for selectively rotating said first and third blocks on said shaft between first and second predetermined angularly spaced positions, actuator means for selectively rotating said shaft between first and second angularly spaced shaft limit positions, actuator means for selectively sliding said first and third blocks on said shaft toward and away from one another, actuator means for selectively shifting said shaft between first and second axially-spaced limit positions, actuator means for operating said foregoing means so as to selectively establish (a) a first condition in which said first and second blocks abut one another in a predetermined plane so as to form a first shift block assembly, (b) a second condition in which said second and third blocks abut one another in said same plane so as to form a second shift block assembly, and (c) third condition in which said second block is disposed between but is axially spaced from said first and third blocks;

means for positioning a C-0 cassette so that its leader tape will be disposed in said first and third guideways;

selectively operable means for cutting the said leader tape disposed in said first and third guideways along said plane so as to form a first leader extending from said cassette to said first block and a second leader extending from said cassette to said third block;

selectively operable splicer means for splicing the end of a use tape held on said second block to the adjacent end of a leader disposed on said first or third blocks; and selectively operable drive means engageable with one of said hubs for rotating said one hub so that a leader attached to said hub and a use tape attached to said leader will be wound onto said hub on command.

27. A cassette tape loading machine according to claim 26 further including means for operating said foregoing means so as to sequentially (a) cut the leader of said C-Zero cassette into first and second leaders supported by said first and third blocks respectively, (b) splice said second leader to a use tape supported by said second block, (c) wind said first leader and a predetermined amount of said use tape into said C-Zero cassette, (d) cut said use tape so as to form a trailing end for said predetermined amount of use tape, that is supported by said third shift block, (d) splice said trailing end to said first leader, and (e) wind said trailing end and said first leader into said C-Zero cassette.

28. A machine for loading tape into C-Zero cassettes comprising:

a shift block assembly comprising first, second and third shift blocks having first, second and third tape guide means respectively, means mounting said shift blocks for rotational movement about a selected common axis, first selectively operable rotational drive means for rotating said first shift block about said common axis, second selectively operable rotational drive means for rotating said second shift block about said common axis, third selectively operable rotational drive means for rotating said third shift block about said common axis, first axial drive means for shifting said first shift block along said axis between first and second limit positions, and second axial drive means for shifting said third shift block along said axis between first and second limit position;

selectively operable tape cutter means for cutting tape extending across said first and second shift blocks or across said second and third shift blocks;

a loading station comprising means for feeding cassettes to be loaded to a predetermined loading position and means for clamping a cassette to be loaded in said predetermined loading position;

takeup means including a rotatable takeup spindle, drive means for rotating said takeup spindle on command, and actuating means for moving said takeup spindle into or out of driving engagement with a hub of a cassette located at said loading station;

a splicer comprising means for cutting and applying a piece of adhesive tape to the abutting ends of two tapes to be spliced supported by said shift block assembly; and control means for sequentially controlling operation of said drive means, said cutter means, said splicer, said cassette feeding means, said clamp means, and said actuator means so as to effectuate the sequential loading of a plurality of cassettes.

29. A machine according to claim 28 wherein said control means is adapted to sequentially (a) sever a leader that has been positioned on said first and third shift blocks into first and second leaders supported by said first and third shift blocks respectively, (b) splice said second leader to the leading end of a use tape positioned on said second shift block; (c) wind said second leader and a predetermined length of the use tape which is connected thereto into a cassette held by the cassette holding means, (d) sever said use tape between said second and third shift blocks so as to form a leading end disposed on said second shift block and a trailing end disposed on said third shift block, and (e) splice said trailing end to the first leader.

30. Method for automatically loading a use tape into a cassette of the kind comprising a cassette case, a pair of hubs, rotatably mounted in said case, a leader tape extending between and attached to the hubs, and a tape concealing door pivotally mounted to the case, comprising the steps of advancing the cassette to be loaded to a first selected loading position, opening the door, moving the cassette with its door open to a second position in which said leader tape is engaged with first and third shift blocks of a shift block assembly comprising first, second and third shift blocks mounted for rotational and axial movement on a common axis and disposed so that portions of said first and third shift blocks are aligned and adjacent to one another and said second shift block is displaced angularly about said axis from said first and third shift blocks, clamping said leader tape to said first and third shift blocks by suction, cutting said leader between said first and third shift blocks so as to form first and second leaders, separating said first and third shift blocks by movement axially along said axis so that said first and second leaders form loops that extend between said first and third shift blocks and the cassette, moving said second and third shift blocks into alignment with one another so that the leading end of a use tape clamped to said second shift block abuts the end of the second leader on said third shift block, splicing said leading end of said use tape to said second leader, winding said second leader and said use tape into said cassette, terminating winding after a predetermined length of tape has been wound into the cassette, cutting said use tape between said second and third shift blocks so as to form a trailing end of use tape on said third shift block and a new leading end of use tape on said second shift block, moving said shift blocks so that said second block is displaced angularly about said axis from said first and third shift blocks and said first and third shift blocks are aligned and adjacent to one another, splicing said first leader to said trailing end of use tape, and winding said trailing end and said first leader into said cassette.

* * * * *